United States Patent
Uziel et al.

(10) Patent No.: US 11,553,461 B2
(45) Date of Patent: Jan. 10, 2023

(54) USER EQUIPMENT AUTONOMOUS RESOURCE SELECTION

(71) Applicant: QUALCOMM Incorporated, San Diego, CA (US)

(72) Inventors: Lior Uziel, Hod Hasharon (IL); Cheol Hee Park, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 171 days.

(21) Appl. No.: 17/165,804

(22) Filed: Feb. 2, 2021

(65) Prior Publication Data

US 2022/0248374 A1 Aug. 4, 2022

(51) Int. Cl.
*H04W 72/02* (2009.01)
*H04W 4/40* (2018.01)
*H04W 92/18* (2009.01)

(52) U.S. Cl.
CPC .......... *H04W 72/02* (2013.01); *H04W 4/40* (2018.02); *H04W 92/18* (2013.01)

(58) Field of Classification Search
CPC .......... H04W 4/40–48; H04W 72/02; H04W 74/0808–0825; H04W 92/18
See application file for complete search history.

(56) References Cited

U.S. PATENT DOCUMENTS 11,102,631 B2 * 8/2021 Zhang ................ H04W 52/346
11,246,114 B2 * 2/2022 Khoryaev ............ H04W 72/02
(Continued)

FOREIGN PATENT DOCUMENTS

WO WO-2018174661 A1 * 9/2018 .......... H04L 5/0044
WO 2019031926 A1 2/2019
(Continued)

OTHER PUBLICATIONS

Intel Corporation: "Transmitter Behavior for Sidelink Resource (Re)selection", 3GPP TSG RAN WG1 Meeting #86, 3GPP Draft, R1-166512, Intel—V2V Selection, 3rd Generation Partnership Project (3GPP), Mobile Competence Centre, 650, Route Des Lucioles, F-06921 Sophia-Antipolis Cedex, France, vol. RAN WG1, No. Gothenburg, Sweden, Aug. 22, 2016-Aug. 26, 2016, 6 Pages, Aug. 21, 2016 (Aug. 21, 2016), XP051125408, Retrieved from the Internet: URL: http://www.3gpp.org/ftp/Meetings_3GPP_SYNC/RAN1/Docs/ [retrieved on Aug. 21, 2016] the whole document.

(Continued)

*Primary Examiner* — Thomas R Cairns
(74) *Attorney, Agent, or Firm* — Patterson & Sheridan, LLP

(57) ABSTRACT

Certain aspects of the present disclosure provide techniques for user equipment (UE) autonomous sidelink resource selection. A method that may be performed by a UE includes performing autonomous sidelink resource selection. The selection includes excluding resources, from a first resource set, associated with transmissions at a signal strength above a signal strength threshold to form a second resource set. The selection includes determining a resource amount in the second resource set is at or above a threshold percentage of a resource amount in the first resource set. The selection includes excluding, from the second resource set, resources associated with physical sidelink control channels (PSCCHs) without excluding resources associated with physical sidelink shared channels associated with the PSCCHs to form a third resource set. The selection includes randomly selecting resources for a PSCCH transmission from the third resource set. The method includes sending the PSCCH transmission using the randomly selected resources.

30 Claims, 13 Drawing Sheets

(56) References Cited

U.S. PATENT DOCUMENTS

2020/0029340 A1* 1/2020 He ................. H04W 72/10
2022/0095281 A1* 3/2022 Zhao ................ H04B 17/318

FOREIGN PATENT DOCUMENTS

WO       2020014979 A1    1/2020
WO   WO-2022077384 A1 *  4/2022
WO   WO-2022085204 A1 *  4/2022

OTHER PUBLICATIONS

International Search Report and Written Opinion—PCT/US2021/063373—ISA/EPO—dated Apr. 7, 2022.

\* cited by examiner

USER EQUIPMENT AUTONOMOUS RESOURCE SELECTION

BACKGROUND

Field of the Disclosure

Aspects of the present disclosure relate to wireless communications, and more particularly, to techniques for user equipment (UE) autonomous resource selection for physical sidelink control channels (PSCCHs)

Description of Related Art

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

These multiple access technologies have been adopted in various telecommunication standards to provide a common protocol that enables different wireless devices to communicate on a municipal, national, regional, and even global level. New radio (e.g., 5G NR) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved user equipment (UE) autonomous resource selection for physical sidelink control channels (PSCCHs).

Certain aspects of the subject matter described in this disclosure can be implemented in a method for wireless communication by a UE. The method generally includes performing autonomous sidelink resource selection. The autonomous sidelink resource selection includes excluding one or more resources, from a first resource set, associated with transmissions at a signal strength above a first signal strength threshold to form a second resource set. The autonomous sidelink resource selection includes determining an amount of resources in the second resource set is at or above a threshold percentage of an amount of resources in the first resource set. The autonomous sidelink resource selection includes excluding, from the second resource set, one or more resources associated with one or more PSCCHs without excluding one or more resources associated with one or more physical sidelink shared channels (PSSCHs) associated with the one or more PSCCHs to form a third resource set comprising the non-excluded resources from the second resource set. The autonomous sidelink resource selection includes randomly selecting one or more resources for a PSCCH transmission from the third resource set. The method generally includes sending the PSCCH transmission using the randomly selected one or more resources.

Certain aspects of the subject matter described in this disclosure can be implemented in an apparatus for wireless communication. The apparatus generally includes at least one processor; and a memory coupled to the at least one processor. The memory generally includes code executable by the at least one processor to cause the apparatus to perform autonomous sidelink resource selection. The autonomous sidelink resource selection includes excluding one or more resources, from a first resource set, associated with transmissions at a signal strength above a first signal strength threshold to form a second resource set. The autonomous sidelink resource selection includes determining an amount of resources in the second resource set is at or above a threshold percentage of an amount of resources in the first resource set. The autonomous sidelink resource selection includes excluding, from the second resource set, one or more resources associated with one or more PSCCHs without excluding one or more resources associated with one or more PSSCHs associated with the one or more PSCCHs to form a third resource set. The autonomous sidelink resource selection includes randomly selecting one or more resources for a PSCCH transmission from the third resource set. The memory generally includes code executable by the at least one processor to cause the apparatus to send the PSCCH transmission using the randomly selected one or more resources.

Certain aspects of the subject matter described in this disclosure can be implemented in an apparatus for wireless communication. The apparatus generally includes means for performing autonomous sidelink resource selection. The means for performing autonomous sidelink resource selection includes means for excluding one or more resources, from a first resource set, associated with transmissions at a signal strength above a first signal strength threshold to form a second resource set. The means for performing autonomous sidelink resource selection includes means for determining an amount of resources in the second resource set is at or above a threshold percentage of an amount of resources in the first resource set. The means for performing autonomous sidelink resource selection includes means for excluding, from the second resource set, one or more resources associated with one or more PSCCHs without excluding one or more resources associated with one or more PSSCHs associated with the one or more PSCCHs to form a third resource set. The means for performing autonomous sidelink resource selection includes means for randomly selecting one or more resources for a PSCCH transmission from the third resource set. The apparatus generally includes means for sending the PSCCH transmission using the randomly selected one or more resources.

Certain aspects of the subject matter described in this disclosure can be implemented in a computer readable medium storing computer executable code thereon for wireless communications. The computer readable medium generally includes code for performing autonomous sidelink resource selection. The code for performing an autonomous sidelink resource selection includes code for excluding one or more resources, from a first resource set, associated with transmissions at a signal strength above a first signal strength threshold to form a second resource set. The code for performing autonomous sidelink resource selection includes code for determining an amount of resources in the second resource set is at or above a threshold percentage of an amount of resources in the first resource set. The code for performing autonomous sidelink resource selection includes code for excluding, from the second resource set, one or more resources associated with one or more PSCCHs without excluding one or more resources associated with one or more PSSCHs associated with the one or more PSCCHs to form a third resource set. The code for performing autonomous sidelink resource selection includes code for randomly selecting one or more resources for a PSCCH transmission from the third resource set. The computer readable medium generally includes code for sending the PSCCH transmission using the randomly selected one or more resources.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
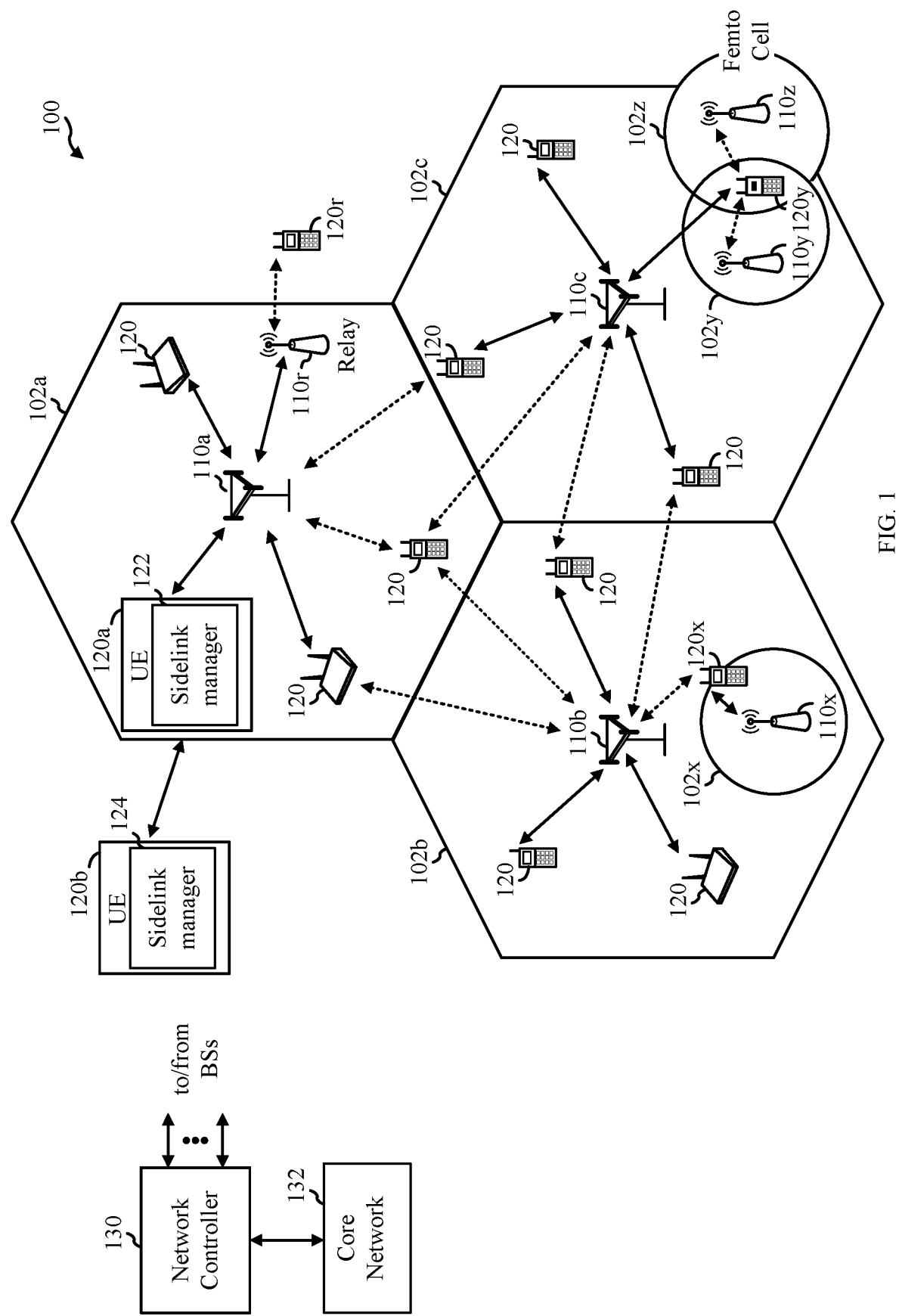
FIG. 1 is a block diagram conceptually illustrating an example wireless communication network, in accordance with certain aspects of the present disclosure.

Aspects of the present disclosure provide apparatus, methods, processing systems, and computer readable mediums for abstaining from selecting physical sidelink control channel (PSCCH) resources in user equipment (UE) autonomous resource selection.

In cellular vehicle-to-anything (C-V2X) systems, user equipment (UE), such as vehicular UEs, may directly communicate with each other using time-frequency resources autonomously selected by the UE. However, the autonomous selection of resources can cause problems when two UEs select the same resources, thereby causing packet collisions or packet overlaps.

Aspects of the present disclosure may help with the autonomous resource selection process. In some examples, a UE may exclude additional PSCCH resources during autonomous resource selection, and can reduce the likelihood of its PSCCH transmission from colliding with another transmission. In some aspects, the UE may adjust a modulation and coding scheme (MCS) and/or a number of resources selected for transmission to further reduce collisions and overlaps with another transmission.

The following description provides examples of abstaining from selecting PSCCH resources during UE autonomous resource selection in communication systems, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs.

The techniques described herein may be used for various wireless networks and radio technologies. While aspects may be described herein using terminology commonly associated with 3G, 4G, and/or new radio (e.g., 5G NR) wireless technologies, aspects of the present disclosure can be applied in other generation-based communication systems.

NR access may support various wireless communication services, such as enhanced mobile broadband (eMBB) targeting wide bandwidth, millimeter wave mmW, massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe.

NR supports beamforming and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

FIG. 1 illustrates an example wireless communication network 100 in which aspects of the present disclosure may be performed. For example, the wireless communication network 100 may be an NR system (e.g., a 5G NR network). As shown in FIG. 1, the wireless communication network 100 may be in communication with a core network 132. The core network 132 may in communication with one or more base station (BSs) 110a-z (each also individually referred to herein as BS 110 or collectively as BSs 110) and/or user equipment (UE) 120a-y (each also individually referred to herein as UE 120 or collectively as UEs 120) in the wireless communication network 100 via one or more interfaces.

According to certain aspects, the UEs 120 may be configured for abstaining from selecting PSCCH resources in UE autonomous resource selection. As shown in FIG. 1, the UE 120 *a* includes a sidelink manager 122. The sidelink manager 122 may be configured to perform an autonomous sidelink resource selection. When performing the autonomous sidelink resource selection, the sidelink manager 122 may be configured to exclude one or more resources, from a first resource set, associated with transmissions at a signal strength above a first signal strength threshold to form a second resource set. When performing the autonomous sidelink resource selection, the sidelink manager 122 may be configured to determine an amount of resources in the second resource set is at or above a threshold percentage of an amount of resources in the first resource set. When performing the autonomous sidelink resource selection, the sidelink manager 122 may be configured to exclude, from the second resource set, one or more resources associated with one or more physical sidelink control channels (PSCCHs) without excluding one or more resources associated with one or more physical sidelink shared channels (PSSCHs) associated with the one or more PSCCHs to form a third resource set. When performing the autonomous sidelink resource selection, the sidelink manager 122 may be configured to randomly select one or more resources for a PSCCH transmission from the third resource set. The sidelink manager 122 may be configured to send the PSCCH transmission using the randomly selected one or more resources, in accordance with aspects of the present disclosure. A UE 120*b* may include a sidelink manager 124 that may be configured to perform the corresponding operations as sidelink manager 122.

A BS 110 may provide communication coverage for a particular geographic area, sometimes referred to as a "cell", which may be stationary or may move according to the location of a mobile BS 110. In some examples, the BSs 110 may be interconnected to one another and/or to one or more other BSs or network nodes (not shown) in wireless communication network 100 through various types of backhaul interfaces (e.g., a direct physical connection, a wireless connection, a virtual network, or the like) using any suitable transport network. In the example shown in FIG. 1, the BSs 110 *a*, 110*b* and 110*c* may be macro BSs for the macro cells 102*a*, 102*b* and 102*c*, respectively. The BS 110*x* may be a pico BS for a pico cell 102*x*. The BSs 110*y* and 110*z* may be femto BSs for the femto cells 102*y* and 102*z*, respectively. A BS may support one or multiple cells.

The BSs 110 communicate with UEs 120 in the wireless communication network 100. The UEs 120 (e.g., 120*x*, 120*y*, etc.) may be dispersed throughout the wireless communication network 100, and each UE 120 may be stationary or mobile. Wireless communication network 100 may also include relay stations (e.g., relay station 110*r*), also referred to as relays or the like, that receive a transmission of data and/or other information from an upstream station (e.g., a BS 110 *a* or a UE 120*r*) and sends a transmission of the data and/or other information to a downstream station (e.g., a UE 120 or a BS 110), or that relays transmissions between UEs 120, to facilitate communication between devices.

A network controller 130 may be in communication with a set of BSs 110 and provide coordination and control for these BSs 110 (e.g., via a backhaul). In aspects, the network controller 130 may be in communication with a core network 132 (e.g., a 5G Core Network (5GC)), which provides various network functions such as Access and Mobility Management, Session Management, User Plane Function, Policy Control Function, Authentication Server Function, Unified Data Management, Application Function, Network Exposure Function, Network Repository Function, Network Slice Selection Function, etc.

Figure 2:
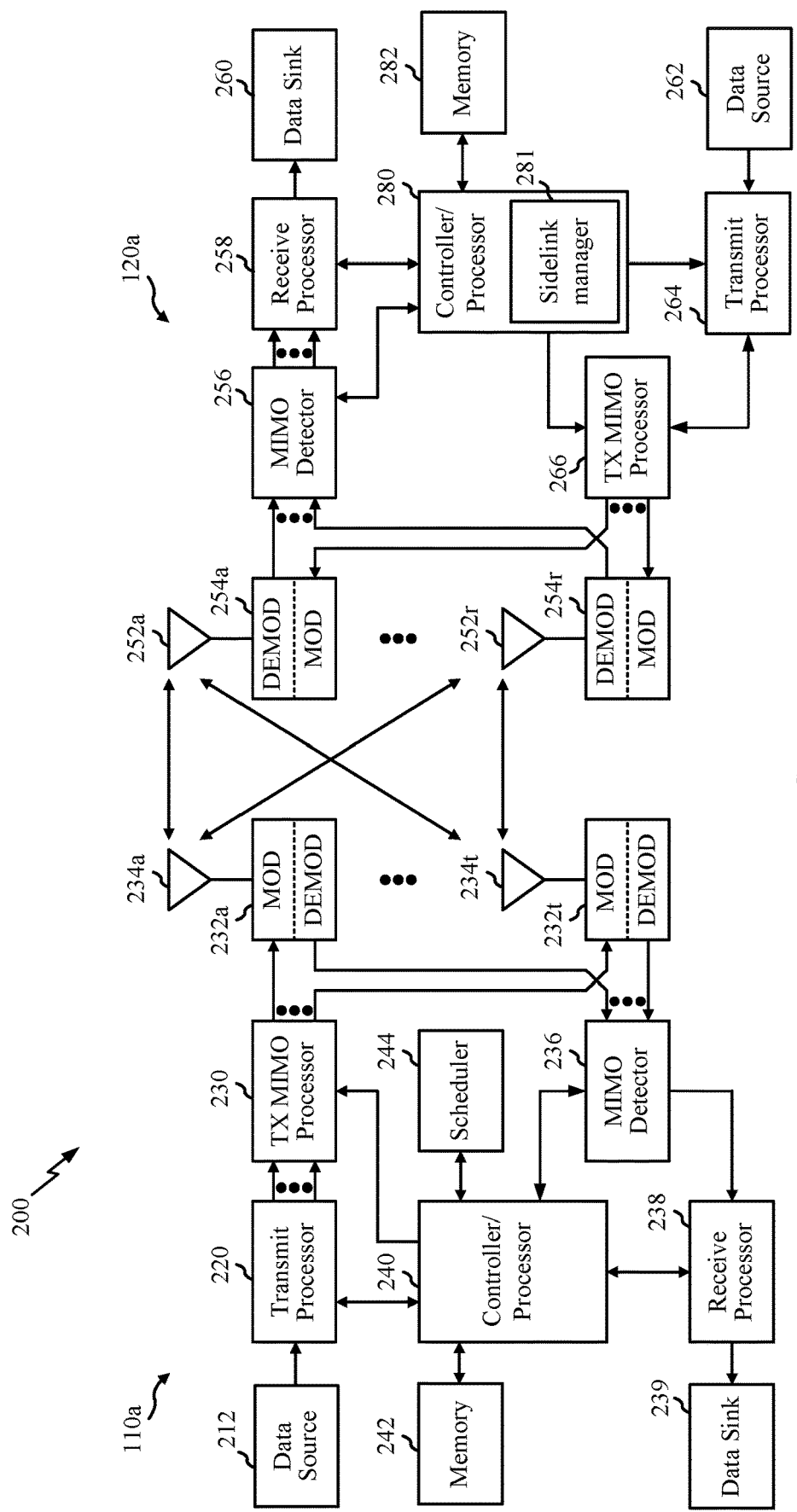
FIG. 2 is a block diagram conceptually illustrating a design of an example a base station (BS) and user equipment (UE), in accordance with certain aspects of the present disclosure.

FIG. 2 illustrates example components of BS 110 a and UE 120 a (e.g., the wireless communication network 100 of FIG. 1), which may be used to implement aspects of the present disclosure.

At the BS 110 a, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. A medium access control (MAC)-control element (MAC-CE) is a MAC layer communication structure that may be used for control command exchange between wireless nodes. The MAC-CE may be carried in a shared channel such as a physical downlink shared channel (PDSCH), a physical uplink shared channel (PUSCH), or a physical sidelink shared channel (PSSCH).

The processor 220 may process (e.g., encode and symbol map) the data and control information to obtain data symbols and control symbols, respectively. The transmit processor 220 may also generate reference symbols, such as for the primary synchronization signal (PSS), secondary synchronization signal (SSS), PBCH demodulation reference signal (DMRS), and channel state information reference signal (CSI-RS). A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) in transceivers 232a-232t. Each modulator in transceivers 232a-232t may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from the modulators in transceivers 232a-232t may be transmitted via the antennas 234a-234t, respectively.

At the UE 120 a, the antennas 252a-252r may receive the downlink signals from the BS 110 a and/or sidelink signals from the UE 120b and may provide received signals to the demodulators (DEMODs) in transceivers 254a-254r, respectively. Each demodulator in transceivers 254a-254r may condition (e.g., filter, amplify, downconvert, and digitize) a respective received signal to obtain input samples. Each demodulator may further process the input samples (e.g., for OFDM, etc.) to obtain received symbols. A MIMO detector 256 may obtain received symbols from all the demodulators in transceivers 254a-254r, perform MIMO detection on the received symbols if applicable, and provide detected symbols. A receive processor 258 may process (e.g., demodulate, deinterleave, and decode) the detected symbols, provide decoded data for the UE 120 a to a data sink 260, and provide decoded control information to a controller/processor 280.

On the uplink and/or sidelink, at UE 120 a, a transmit processor 264 may receive and process data (e.g., for the physical uplink shared channel (PUSCH) and/or physical sidelink shared channel (PSSCH)) from a data source 262 and control information (e.g., for the physical uplink control channel (PUCCH) and/or physical sidelink control channel (PSCCH)) from the controller/processor 280. The transmit processor 264 may also generate reference symbols for a reference signal (e.g., for the sounding reference signal (SRS)). The symbols from the transmit processor 264 may be precoded by a TX MIMO processor 266 if applicable, further processed by the modulators in transceivers 254a-254r (e.g., for SC-FDM, etc.), and transmitted to the BS 110 a and/or UE 120b. At the BS 110 a, the uplink signals from the UE 120 a may be received by the antennas 234, processed by the demodulators in transceivers 232a-232t, detected by a MIMO detector 236 if applicable, and further processed by a receive processor 238 to obtain decoded data and control information sent by the UE 120 a. The receive processor 238 may provide the decoded data to a data sink 239 and the decoded control information to the controller/processor 240.

The memories 242 and 282 may store data and program codes for BS 110 a and UE 120 a, respectively. A scheduler 244 may schedule UEs for data transmission on the downlink and/or uplink.

Antennas 252, processors 266, 258, 264, and/or controller/processor 280 of the UE 120 a may be used to perform the various techniques and methods described herein. For example, as shown in FIG. 2, the controller/processor 280 of the UE 120 a has a sidelink manager 281 that may be configured to abstain from selecting PSCCH resources in UE autonomous resource selection, according to aspects described herein. Although shown at the controller/processor, other components of the UE 120 a and BS 110 a may be used to perform the operations described herein.

NR may utilize orthogonal frequency division multiplexing (OFDM) with a cyclic prefix (CP) on the uplink and downlink. NR may support half-duplex operation using time division duplexing (TDD). OFDM and single-carrier frequency division multiplexing (SC-FDM) partition the system bandwidth into multiple orthogonal subcarriers, which are also commonly referred to as tones, bins, etc. Each subcarrier may be modulated with data. Modulation symbols may be sent in the frequency domain with OFDM and in the time domain with SC-FDM. The spacing between adjacent subcarriers may be fixed, and the total number of subcarriers may be dependent on the system bandwidth. The minimum resource allocation, called a resource block (RB), may be 12 consecutive subcarriers. The system bandwidth may also be partitioned into subbands. For example, a subband may cover multiple RBs. NR may support a base subcarrier spacing (SCS) of 15 KHz and other SCS may be defined with respect to the base SCS (e.g., 30 kHz, 60 kHz, 120 kHz, 240 kHz, etc.).

Figure 3:
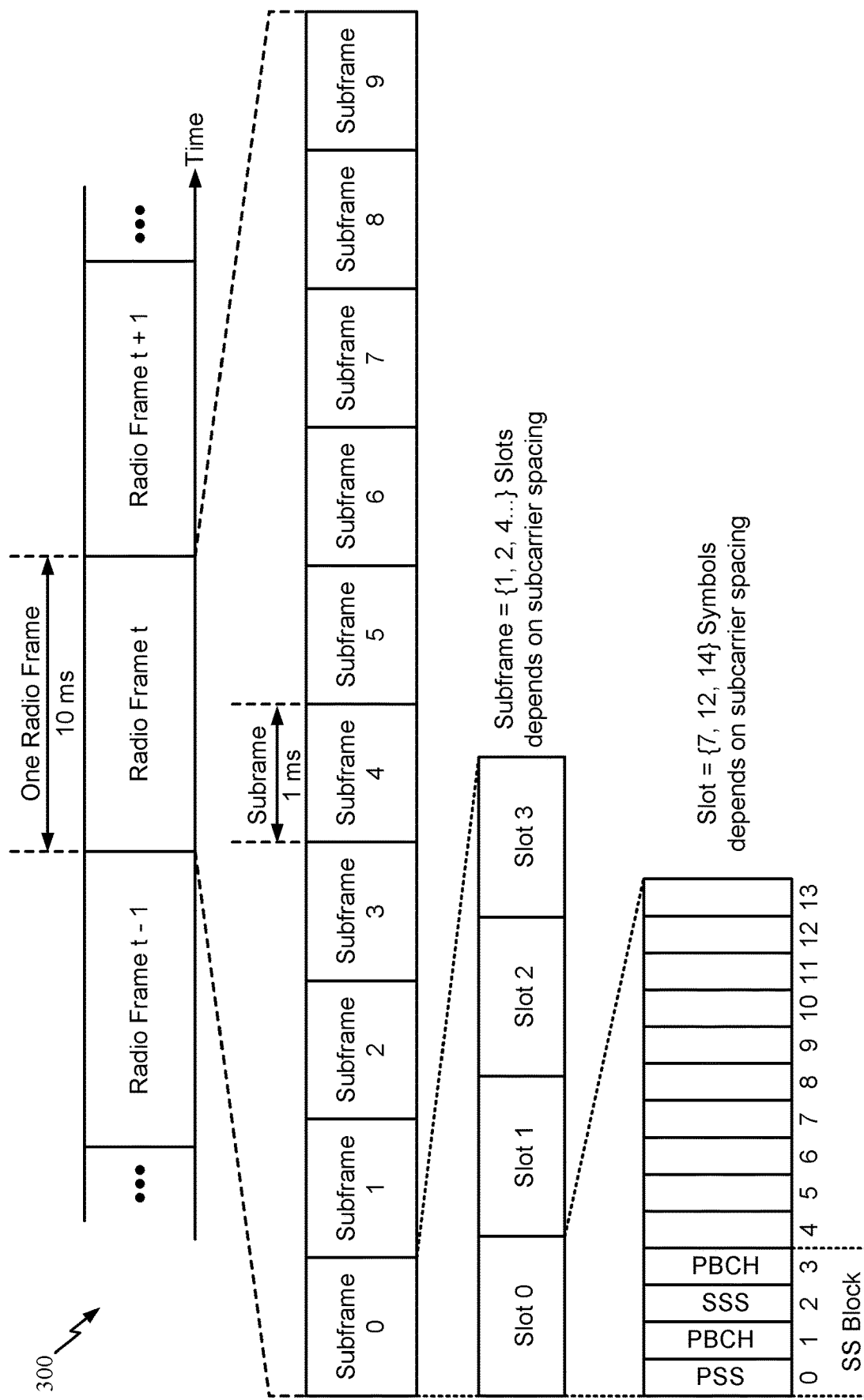
FIG. 3 is an example frame format for certain wireless communication systems (e.g., new radio (NR)), in accordance with certain aspects of the present disclosure.

FIG. 3 is a diagram showing an example of a frame format 300 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots (e.g., 1, 2, 4, 8, 16, . . . slots) depending on the SCS. Each slot may include a variable number of symbol periods (e.g., 7, 12, or 14 symbols) depending on the SCS. The symbol periods in each slot may be assigned indices. A sub-slot structure may refer to a transmit time interval having a duration less than a slot (e.g., 2, 3, or 4 symbols). Each symbol in a slot may be configured for a link direction (e.g., DL, UL, or flexible) for data transmission and the link direction for each subframe may be dynamically switched. The link directions may be based on the slot format. Each slot may include DL/UL data as well as DL/UL control information.

In NR, a synchronization signal block (SSB) is transmitted. In certain aspects, SSBs may be transmitted in a burst where each SSB in the burst corresponds to a different beam direction for UE-side beam management (e.g., including beam selection and/or beam refinement). The SSB includes a PSS, a SSS, and a two symbol PBCH. The SSB can be transmitted in a fixed slot location, such as the symbols 0-3 as shown in FIG. 3. The PSS and SSS may be used by UEs for cell search and acquisition. The PSS may provide half-frame timing, the SS may provide the CP length and frame timing. The PSS and SSS may provide the cell identity. The PBCH carries some basic system information, such as downlink system bandwidth, timing information within radio frame, SS burst set periodicity, system frame number, etc. The SSBs may be organized into SS bursts to support beam sweeping. Further system information such as, remaining minimum system information (RMSI), system information blocks (SIBs), other system information (OSI) can be transmitted on a PDSCH in certain subframes. The SSB can be transmitted up to sixty-four times, for example, with up to sixty-four different beam directions for mmWave. The multiple transmissions of the SSB are referred to as a SS burst set. SSBs in an SS burst set may be transmitted in the same frequency region, while SSBs in different SS bursts sets can be transmitted at different frequency regions.

In some examples, the communication between the UEs 120 and BSs 110 is referred to as the access link. The access link may be provided via a Uu interface. Communication between devices may be referred as the sidelink. Sidelink communications may be provided via a PC5 interface.

In some examples, two or more subordinate entities (e.g., UEs 120) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE 120 *a*) to another subordinate entity (e.g., another UE 120) without relaying that communication through the scheduling entity (e.g., UE 120 or BS 110), even though the scheduling entity may be utilized for scheduling and/or control purposes. In some examples, the sidelink signals may be communicated using a licensed spectrum (unlike wireless local area networks, which typically use an unlicensed spectrum). One example of sidelink communication is PC5, for example, as used in V2V, LTE, and/or NR.

Various sidelink channels may be used for sidelink communications, including a physical sidelink discovery channel (PSDCH), a physical sidelink control channel (PSCCH), a physical sidelink shared channel (PSSCH), and a physical sidelink feedback channel (PSFCH). The PSDCH may carry discovery expressions that enable proximal devices to discover each other. The PSCCH may carry control signaling such as sidelink resource configurations and other parameters used for data transmissions, and the PSSCH may carry the data transmissions. The PSFCH may carry feedback such as CSI related to a sidelink channel quality.

Figure 4:
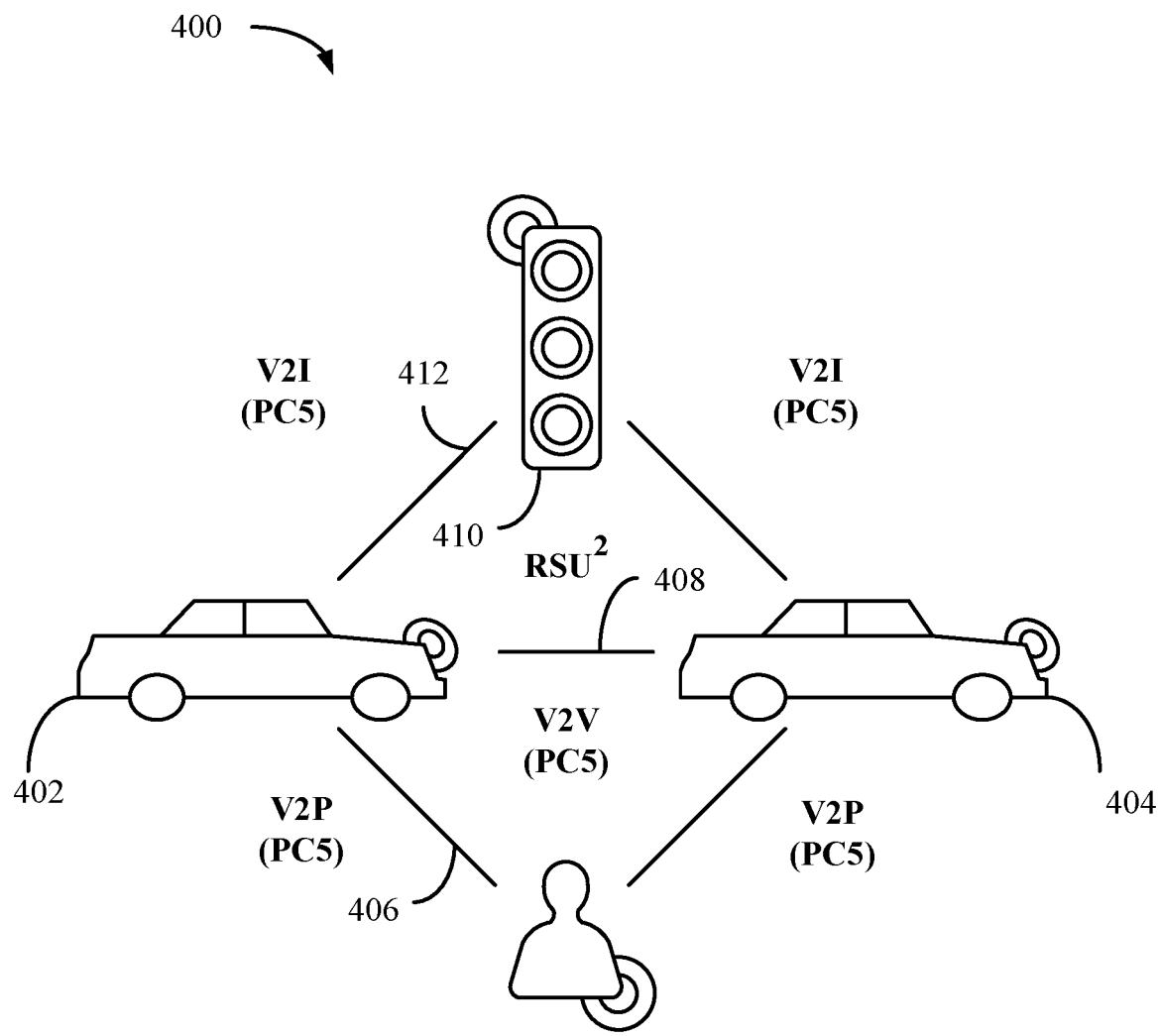
FIG. 4 illustrates an example vehicle-to-everything (V2X) communication system, in accordance with certain aspects of the present disclosure.
Figure 5:
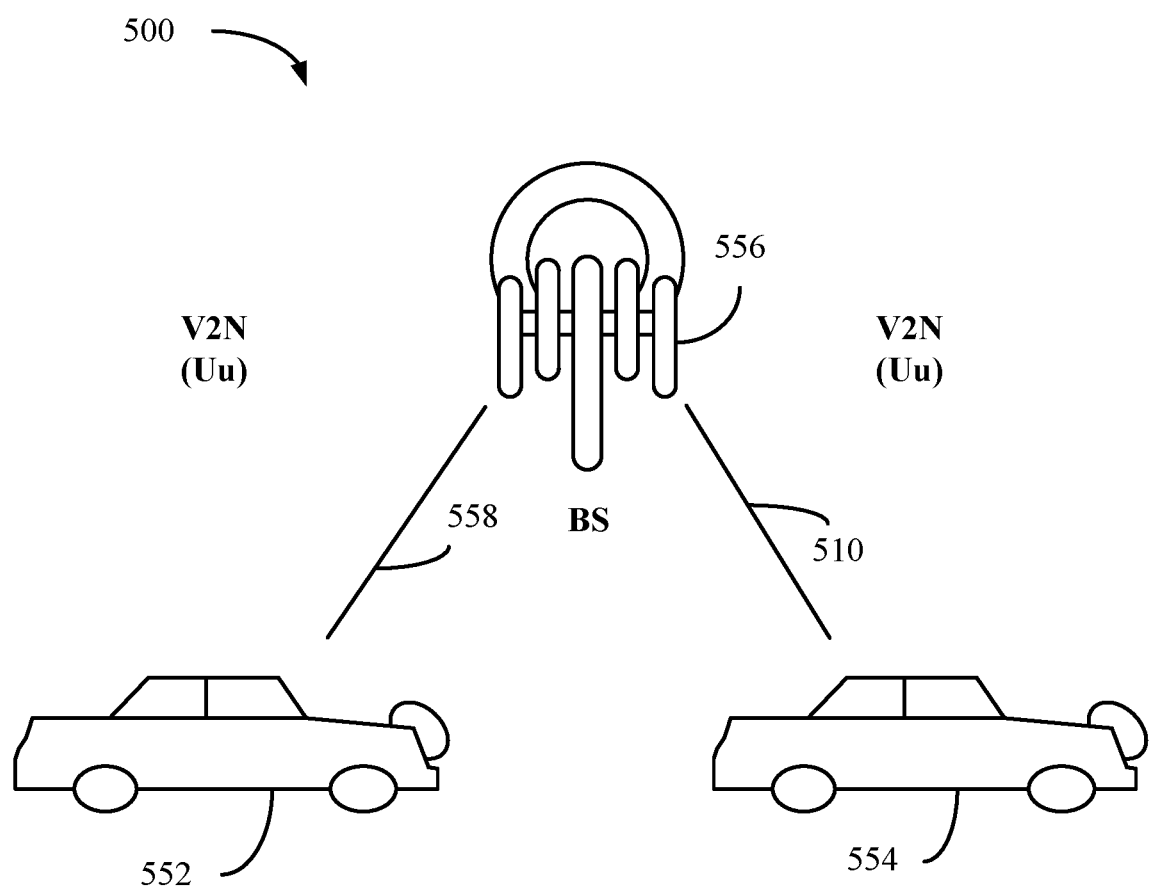
FIG. 5 illustrates another example V2X communication system, in accordance with certain aspects of the present disclosure.

FIG. 4 and FIG. 5 show diagrammatic representations of example vehicle-to-everything (V2X) systems, in accordance with some aspects of the present disclosure. For example, the vehicles shown in FIG. 4 and FIG. 5 may communicate via sidelink channels and may relay sidelink transmissions as described herein.

The V2X systems, provided in FIG. 4 and FIG. 5 provide two complementary transmission modes. A first transmission mode (also referred to as mode 4), shown by way of example in FIG. 4, involves direct communications (for example, also referred to as side link communications) between participants in proximity to one another in a local area. A second transmission mode (also referred to as mode 3), shown by way of example in FIG. 5, involves network communications through a network, which may be implemented over a Uu interface (for example, a wireless communication interface between a radio access network (RAN) and a UE).

Referring to FIG. 4, a V2X system 400 (for example, including vehicle to vehicle (V2V) communications) is illustrated with two vehicles 402, 404. The first transmission mode allows for direct communication between different participants in a given geographic location. As illustrated, a vehicle can have a wireless communication link 406 with an individual (vehicle-to-person (V2P)) (for example, via a UE) through a PC5 interface. Communications between the vehicles 402 and 404 may also occur through a PC5 interface 408. In a like manner, communication may occur from a vehicle 402 to other highway components (for example, highway component 410), such as a traffic signal or sign (vehicle-to-infrastructure (V2I)) through a PC5 interface 412. With respect to each communication link illustrated in FIG. 4, two-way communication may take place between elements, therefore each element may be a transmitter and a receiver of information. The V2X system 400 may be a self-managed system implemented without assistance from a network entity. A self-managed system may enable improved spectral efficiency, reduced cost, and increased reliability as network service interruptions do not occur during handover operations for moving vehicles. The V2X system may be configured to operate in a licensed or unlicensed spectrum, thus any vehicle with an equipped system may access a common frequency and share information. Such harmonized/common spectrum operations allow for safe and reliable operation.

FIG. 5 shows a V2X system 500 for communication between a vehicle 552 and a vehicle 554 through a network entity 556. These network communications may occur through discrete nodes, such as a BS (e.g., the BS 110 *a*), that sends and receives information to and from (for example, relays information between) vehicles 552, 554. The network communications through vehicle to network (V2N) links 558 and 510 may be used, for example, for long range communications between vehicles, such as for communicating the presence of a car accident a distance ahead along a road or highway. Other types of communications may be sent by the wireless node to vehicles, such as traffic flow conditions, road hazard warnings, environmental/weather reports, and service station availability, among other examples. Such data can be obtained from cloud-based sharing services.

Roadside units (RSUs) may be utilized. An RSU may be used for V2I communications. In some examples, an RSU may act as a forwarding node to extend coverage for a UE. In some examples, an RSU may be co-located with a BS or may be standalone. RSUs can have different classifications. For example, RSUs can be classified into UE-type RSUs and Micro NodeB-type RSUs. Micro NB-type RSUs have similar functionality as the Macro eNB/gNB. The Micro NB-type RSUs can utilize the Uu interface. UE-type RSUs can be used for meeting tight quality-of-service (QoS) requirements by minimizing collisions and improving reliability. UE-type RSUs may use centralized resource allocation mechanisms to allow for efficient resource utilization. Critical information (e.g., such as traffic conditions, weather conditions, congestion statistics, sensor data, etc.) can be broadcast to UEs in the coverage area. Relays can rebroadcasts critical information received from some UEs. UE-type RSUs may be a reliable synchronization source.

Figure 6:
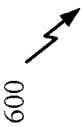
FIG. 6 is a table of parameters used for sidelink transmissions in C-V2X systems, in accordance with certain aspects of the present disclosure.

Sidelink communications can include cellular V2X (C-V2X) communications. A C-V2X system may operate in various modes. FIG. 6 is an example table 600 of PSCCH transmission parameters (e.g., as defined in TS 36.211 Table 9.8-2) for various sidelink modes.

An example C-V2X mode, referred to as Mode 3, may be used when the UE is in an in-coverage area. In the C-V2X Mode 3, the network may control allocation of resources for the sidelink UEs. In another example C-V2X mode, referred to as Mode 4, the sidelink UEs may autonomously select resources (e.g., resource blocks (RBs)) used for transmissions. The resources may be semi-persistent scheduling (SPS) resources. In some examples, the sidelink UEs can autonomously select resources based on an SPS algorithm. The SPS algorithm may be configured, hardcoded, or pre-configured at the UE. For example, the SPS algorithm may be based on an SPS algorithm defined in the 3GPP technical standards.

In some systems, a UE may select resources to transmit using a sensing mechanism. By sensing available and unavailable resources, the UE can select and transmit on vacant resources, which may reduce or prevent collisions. The sensing may involve power estimation (e.g., resource signal strength indicator (RSSI) measurements). The power estimation may exclude unmeasured subframes (e.g. due to previous transmissions). The resource selection may exclude resources based on expected conflict with other UE's transmissions. Hidden UEs; however, may be unaware of each other and, therefore, unable to exclude each other resources. Thus, transmissions by these UEs may collide on neighboring UEs.

In some cases, a "hidden terminal" scenario may occur due to the dynamically changing environment. For example, when the sidelink UE selects resources for transmissions (e.g., in the Mode 4), some other UEs (e.g., vehicles) may be hidden (e.g., undetected), such as when a channel sensing is performed. Thus, two (or more) UEs may (e.g., autonomously) select the same resources. Hidden terminal scenarios (leading to packet collision) may occur when UEs have overlapping coverage area while assigning RBs for transmission.

Figure 7A:
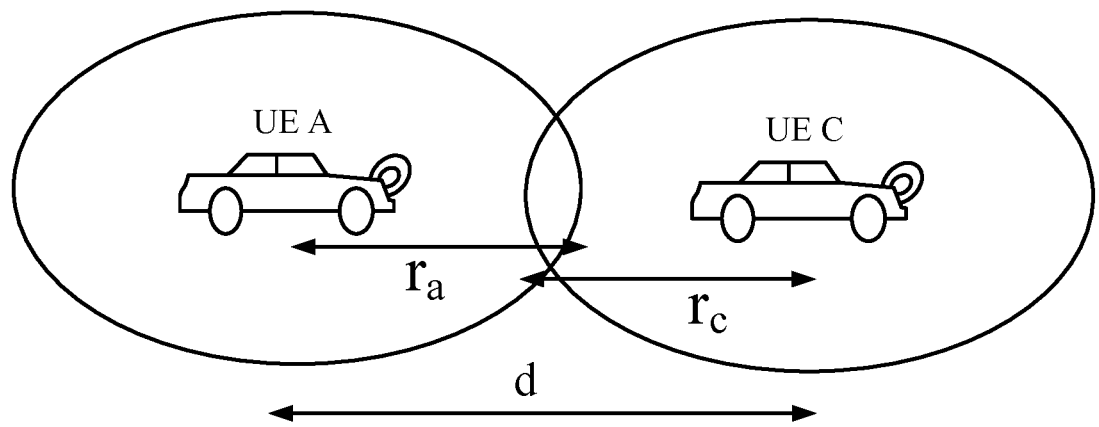
FIGS. 7A and 7B show example collisions in congestion scenarios, in accordance with certain aspects of the present disclosure.
Figure 7B:
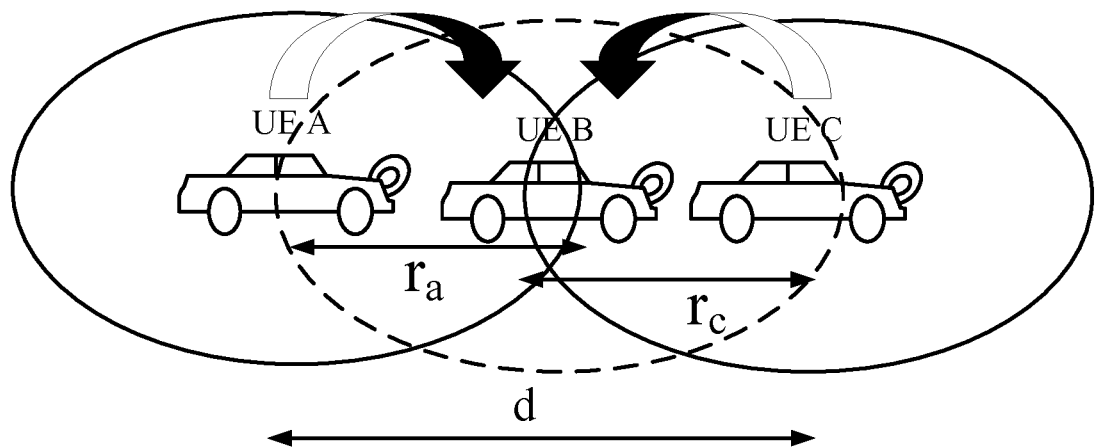

FIG. 7A illustrates an example congestion scenario. The UE A and UE C cannot sense each other's presence, for example, because these UEs are outside the coverage range of each other. As shown in FIG. 7A, the physical distance, d, between UE A and UE C is at least $r_A + r_C$, where $r_A$ is the radius of UEs A's coverage and $r_C$ is the radius of UE C's coverage. UE A does not know about the existence of UE C (the "hidden node"), and similarly, UE C does not know about the existence of UE A. Because UE A and UE C do not know about the other, both UEs may allocate/select the same time-frequency resources (some or all) (e.g., overlapping RBs) for transmission. In this case, UEs in the common area of UE A and UE C (A ∩ C), such as UE B shown in FIG. 7B) cannot decode the data transmitted from either UE A or UE C using the allocated resources, due to the packet collision.

Collisions and overlaps may be seen in congested scenarios. As used herein, overlap occurs when two or more UEs transmit control (e.g., PSCCH) and data channels (e.g., PSSCH) on the same resources and collision occurs when two or more UEs transmit control channels (e.g., PSCCHs) on the same resources.

Figure 8A:
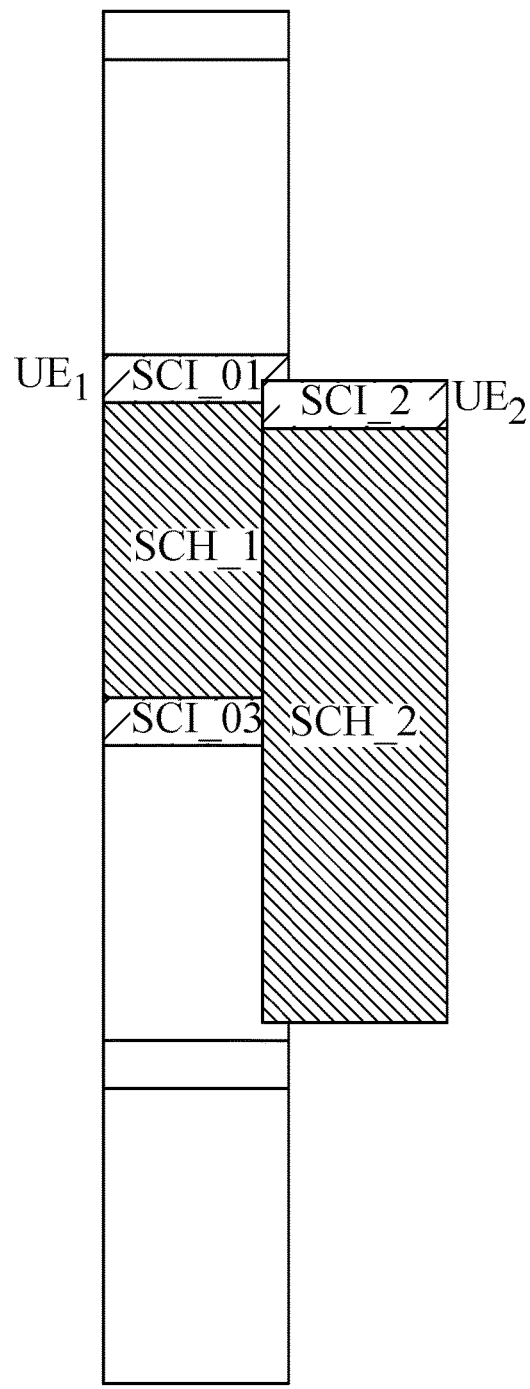
FIG. 8A illustrates example collision by UEs in cellular V2X (C-V2X) direct communications, in accordance with certain aspects of the present disclosure.
Figure 8B:
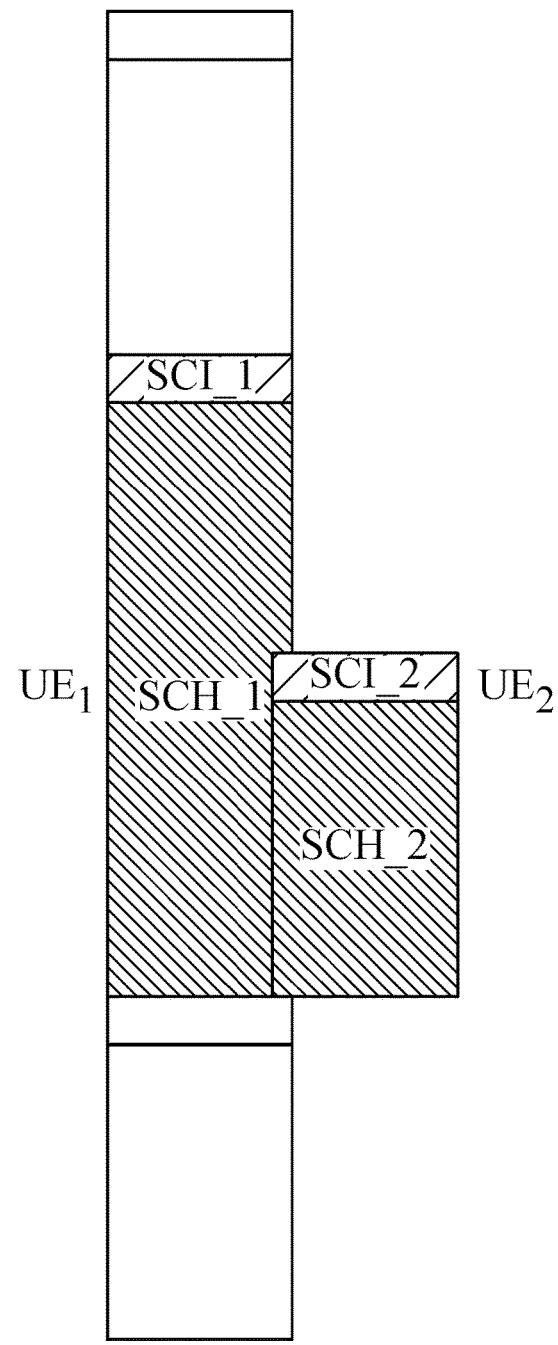
FIG. 8B illustrates example overlap by UEs in C-V2X direct communications, in accordance with certain aspects of the present disclosure.

FIG. 8A illustrates an example collision scenario and FIG. 8B illustrates an example overlapping scenario. During a collision, as shown in FIG. 8A, the PSCCH transmissions from UE1 and UE2 are transmitted on the same resources. During an overlap, as shown in FIG. 8B, the PSSCH and PSCCH transmissions from UE 1 and UE2, respectively, are transmitted using the same resources.

For both collisions and overlaps, if the UE1 and UE2 transmit PSCCH and PSSCH transmissions, other UEs may not detect the PSCCH (e.g., with sidelink control SCI). Although transmissions from two UEs are shown in FIGS. 8A and 8B, the system may involve sidelink transmissions from any number of UEs.

Figure 9:
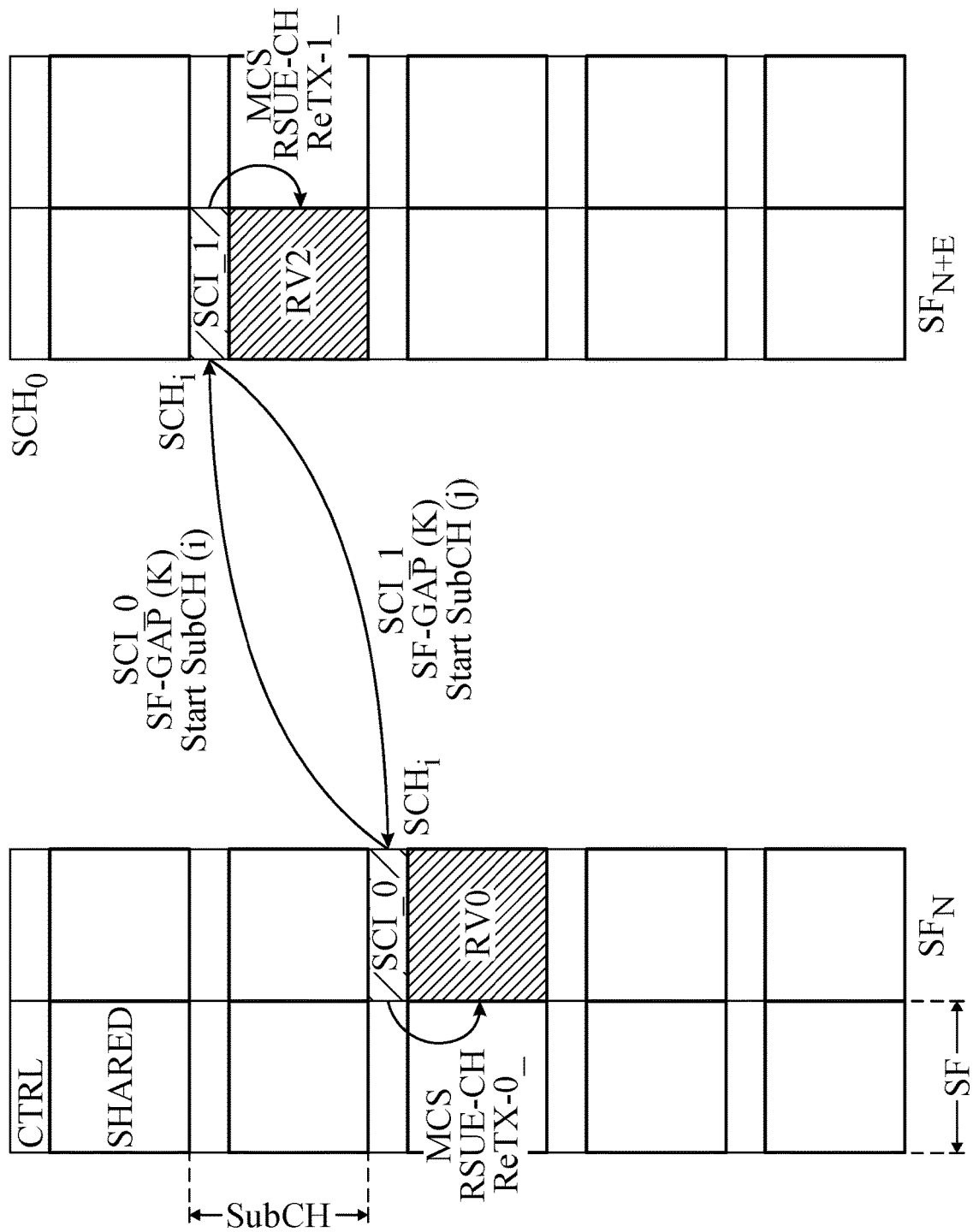
FIG. 9 illustrates example sidelink control information (SCI) transmission and retransmission, in accordance with certain aspects of the present disclosure.

SCI may be carried on the PSCCH and provide information regarding sidelink transmission, such as a scheduled PSSCH transmission. Thus, a UE can determine information about potential overlap or collisions from the information carried in the SCI. With SPS transmissions, an SPS transmission may be for a transmission period (e.g., 20, 50, 100, 200, . . . , 1000 subframes). Thus, a UE can determine information about potential overlap or collisions from the periodicity of the SPS transmissions. Hybrid automatic repeat request (HARD) transmissions may point to each other. For example, redundancy versions (e.g., $RV_0$, $RV_2$) may be associated (e.g., there may be a 1, 2, 15 subframe gaps between redundancy versions). Thus, information regarding one RV may be determined from information about another RV. FIG. 9 illustrates an example SCI RV pair.

In C-V2X Mode 4, vehicles autonomously select their resources without the assistance of the cellular infrastructure. Vehicles may use a sensing-based SPS scheduling scheme. A vehicle may reserve the selected resource(s) for a random number of consecutive packets. The number of packet may depend on the number of packets transmitted per second, or inversely on the packet transmission interval. When a vehicle reserves new resources, the vehicle may randomly selects a reselection counter. After each transmission, the reselection counter is decremented by one. When the reselection counter is equal to zero, new resources are selected and reserved. The new resources may be selected and reserved according to a probability. Each vehicle may include its packet transmission interval and the value of its reselection counter in its SCI. Vehicles can use this information to estimate which resources are free when making their own reservation to reduce packet collisions.

The vehicle may reserve resources from within a selection window. The selection window may be the time window between the time the packet has been generated and a defined maximum latency. Within the selection window, the vehicle may create a list of available resources it could reserve. This list can include all the resources excluding resources that meet certain conditions. For example, the list may exclude resources for which the vehicle has received an SCI from another vehicle in the last N (e.g., a preconfigured number) subframes indicating that the other vehicle will utilize this resource in the selection window or any of its next reselection counter packets. The list may exclude resources for which the vehicle measures an average signal strength (e.g., such as reference signal received power (RSRP) or received signal strength indicator (RSSI)) that is higher than a given threshold. After excluding resources to create the list, the vehicle may determine whether the list contains a threshold amount (e.g., 20%) of all the resources initially identified in the selection window. If the list does not contain the threshold percentage of resources, then the vehicle iterates the list creation until the threshold is met. In each iteration, the vehicle increases the signal strength threshold (e.g., by 3 dB). The vehicle then randomly chooses one of the candidate resources in the list of candidate resources, and reserves the randomly selected resource for the next reselection counter transmissions.

The number of resources for the transmission may be derived from any of the following: a number specified by the congestion level ($N_{limit}$), the message size (e.g., protocol data unit (PDU) packet size), and the allowed modulation and coding schemes (MCSs) and physical resource blocks (PRBs). A scheduler (e.g., at the vehicle) may start from a default MCS and/or default subchannel(s) values and search the correct "working point" of resources. For example, a scheduler may adjust the default MCS and/or subchannel values to find either a more robust MCS and a larger number of PRBs or a more efficient MCS and smaller number of PRBs that is suitable for the transmission.

In some cases, when the UE autonomously selects resources, the UE excludes detected resources having a signal strength higher than a given threshold and will not exclude the resources (e.g., subchannels) of detected resources (e.g., detected PSCCH transmissions) having a signal strength and will not exclude the non-detected PSCCH transmissions (e.g., an undetected PSCCH that is indicated by a missed HARQ RV0 or by SPS and/or an undetected PSCCH with no indication). Not excluding resources of non-detected PSCCH transmission may lead to congestion (e.g., collisions and/or overlaps. Collisions and/or overlap may also cause measurements assisting link management (e.g. sync-time offset and/or frequency offset) to be missed. In some cases, because of misdetection of the PSCCH, the UEs may misdetect PSSCH transmissions because the sidelink control information points to the corresponding sidelink data transmission.

Congestion can be detrimental to C-V2X communications and can lead to competition (e.g. dedicated short range communication (DSRC)) promotion. Congestion may impact packet error rate (PER) and/or information age (IA).

Accordingly, what is needed are techniques and apparatus for UE autonomous resource selection to may reduce or avoid collisions and/or overlaps.

Example Abstaining from PSCCH Resources During UE Autonomous Resource Selection

Aspects of the present disclosure provide techniques for abstaining from (e.g., avoiding or reducing) selecting physical sidelink control channel (PSCCH) resources during user equipment (UE) autonomous sidelink resource selection. Abstaining from selecting PSCCH resources during UE autonomous sidelink resource selection may reduce collisions (e.g., PSCCH on PSCCH allocations) and overlaps (e.g., physical sidelink shared channel (PSSCH) on PSCCH allocations).

Abstaining from selecting PSCCH resources may involve using marked PSCCHs known from sidelink control information (SCI) of a detected redundancy version (RV) to determine which PSCCH resources to abstain from selecting. For example, a UE may receive an initial SCI transmission (e.g., $RV_0$). The initial SCI may point to an SCI retransmission (e.g., $RV_2$). The UE can also determine SCIs based on a semi-persistent scheduling (SPS) periodicity.

Figure 10:
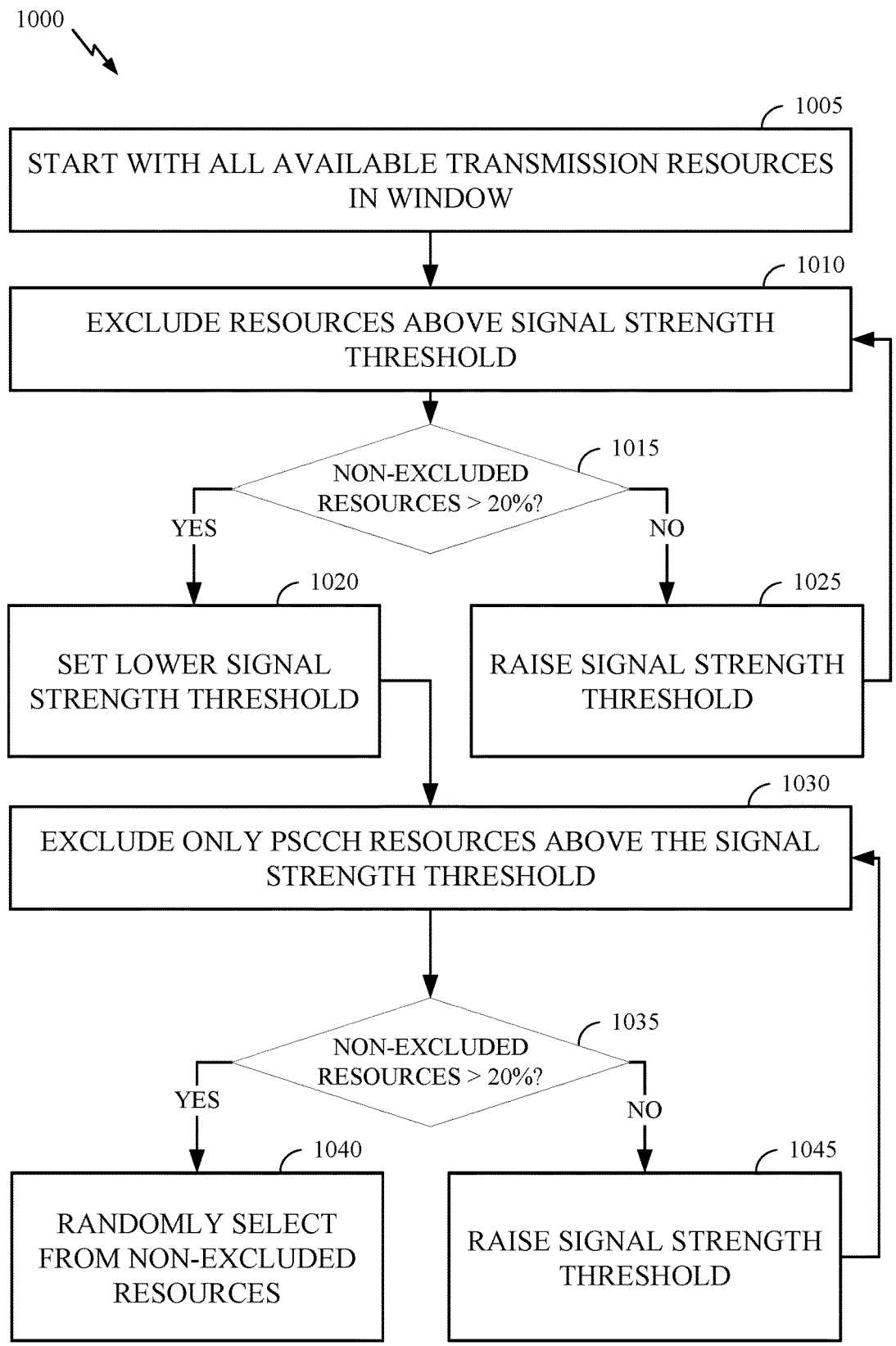
FIG. 10 is a decision tree diagram illustrating the autonomous resource reselection process, in accordance with aspects of the present disclosure.

FIG. 10 is a decision tree diagram of the autonomous resource selection process, in accordance with certain aspects of the present disclosure. The autonomous resource selection process 1000 may be performed, for example, by a UE (e.g., such as the UE 120 a in the wireless communication network 100). The autonomous resource selection process 1000 may be implemented as software components that are executed and run on one or more processors (e.g., controller/processor 280 of FIG. 2).

In some examples, the UE follows the cellular vehicular to anything (C-V2X) mode 4 autonomous reselection described above. The autonomous resource selection process 1000 may begin at 1005 by starting with all available transmission resources in a window (e.g., a first resource set including all available transmission resources in the window).

As illustrated, when reducing collisions, the UE excludes resources (e.g., PSCCH resources used for SCI transmission) that above/below a signal strength threshold for the autonomous sidelink resource selection process. At 1010, the UE excludes resources above a signal strength threshold, which forms a second resource set of non-excluded resources. For example, the UE may set a signal strength threshold, such as a reference signal received power (RSRP) threshold, and compare signal strength of the resources against the signal strength threshold. Based on the comparison of the signal strength of the resources against the signal strength threshold, the UE may exclude the resources if the resources' signals strength is higher than the signal strength threshold.

The UE may perform the exclusion until the threshold amount (e.g., at least 20%) of the PSCCHs remain. At 1015, the UE determines whether the amount of non-excluded resources (e.g., the amount of resources in the second resource set) is greater than a threshold percentage (e.g., 20%) of the total available transmission resources in the window (e.g., the first resource set). If the amount of non-excluded resources is less than the threshold percentage of the amount of all available transmission resources in the window, then at 1025, the UE raises the signal strength threshold so that fewer resources are excluded and the amount of non-excluded resources is more likely to above the threshold percentage. Accordingly, the UE repeats the steps of excluding resources above the signal strength threshold (at 1010) and determining whether the amount of non-excluded resources is greater than the threshold percentage (at 1015). As illustrated, the UE may perform resource exclusion in the autonomous resource selection by adjusting (e.g., raising) the signal strength threshold and excluding both PSCCH and corresponding PSSCH resources (e.g., the PSSCH resources indicated by SCI in the PSCCH) until the amount of resources (e.g., non-excluded resources) in the list is equal to or greater than the threshold percentage (e.g., 20%) of the initially identified resources in the transmission window.

If the amount of non-excluded resources (e.g., the amount of resources in the second resource set) is greater than the threshold percentage of the amount of total available transmission resources in the window (i.e., the first resource set), then at 1020, the UE may set a lower signal strength threshold. In some aspects, the UE can reset the signal strength threshold to an initial or default value if the UE had raised the threshold during the resource exclusion at 1025.

After setting the lower signal strength threshold, at 1030, the UE excludes only PSCCH resources above the signal strength threshold. This exclusion forms a third resource set, which includes non-excluded resources from the second resource set. In some aspects, the UE excludes only the PSCCH resources and not the corresponding PSSCH resources. Thus, the UE can exclude more PSCCHs and reduce the likelihood of collisions. The exclusion process may include non-physical parameters, such as priority or a corresponding RV to a missed initial transmission (e.g., an RV2 of a missed RV0).

At 1035, the UE determines whether the amount of non-excluded resources after the most recent round of exclusions (i.e., the amount of non-excluded resources in the third resource set) is greater than the threshold percentage (e.g., 20%) of the amount of all available transmission resources in the window. If less than the threshold percentage of resources remain, then at 1045, the UE increases (e.g., raises) the signal strength threshold by a predefined amount (e.g., 3 dB) and repeats the exclusion (at 1030) using the increased signal strength threshold and re-determines (at 1035) whether the amount of non-excluded resources after exclusion is still less than the threshold percentage. The UE iterates this process until the amount of non-excluded resources reaches the threshold percentage.

If the UE determines that the amount of non-excluded resources after the most recent round of exclusions (i.e., the amount of non-excluded resources in the third resource set) is greater than the threshold percentage (e.g., 20%) of the amount of all available transmission resources in the window, at 1040 the UE randomly selects resources for PSCCH transmission from the non-excluded PSCCH resources (i.e., the third resource set). In some aspects, the UE may allocate the resources using a default number of resources (e.g., subchannels) and/or a default modulation and coding scheme (MCS) for the PSCCH transmission.

According to certain aspects, to reduce overlaps, the UE may adjust a default MCS and/or a default number of resources to avoid selecting a resource with a "marked" PSCCH transmission. By adjusting the default MCS and default number of resources, the UE can tailor the random resource selection so that when the UE randomly selects resources, the resources the UE selects avoid overlapping with shared channel transmissions.

When adjusting the default MCS and/or the default number of resources, the UE may increase the default MCS and correspondingly decrease the default number of subchannels or decrease the default MCS and correspondingly increase the default number of subchannels. In some examples, the UE may search for a more robust MCS with an increased number of subchannels by adding subchannels not containing marked PSCCHs. Increasing subchannels may involve reducing a PSCCH index or adding another PSSCH subchannel. In some aspects, the UE may search for a less robust MCS with decreased number of subchannels. In such aspects, the UE removes subchannels containing marked PSCCH, which may involve increasing PSCCH index or reducing the last PSCCH subchannel.

Figure 11:
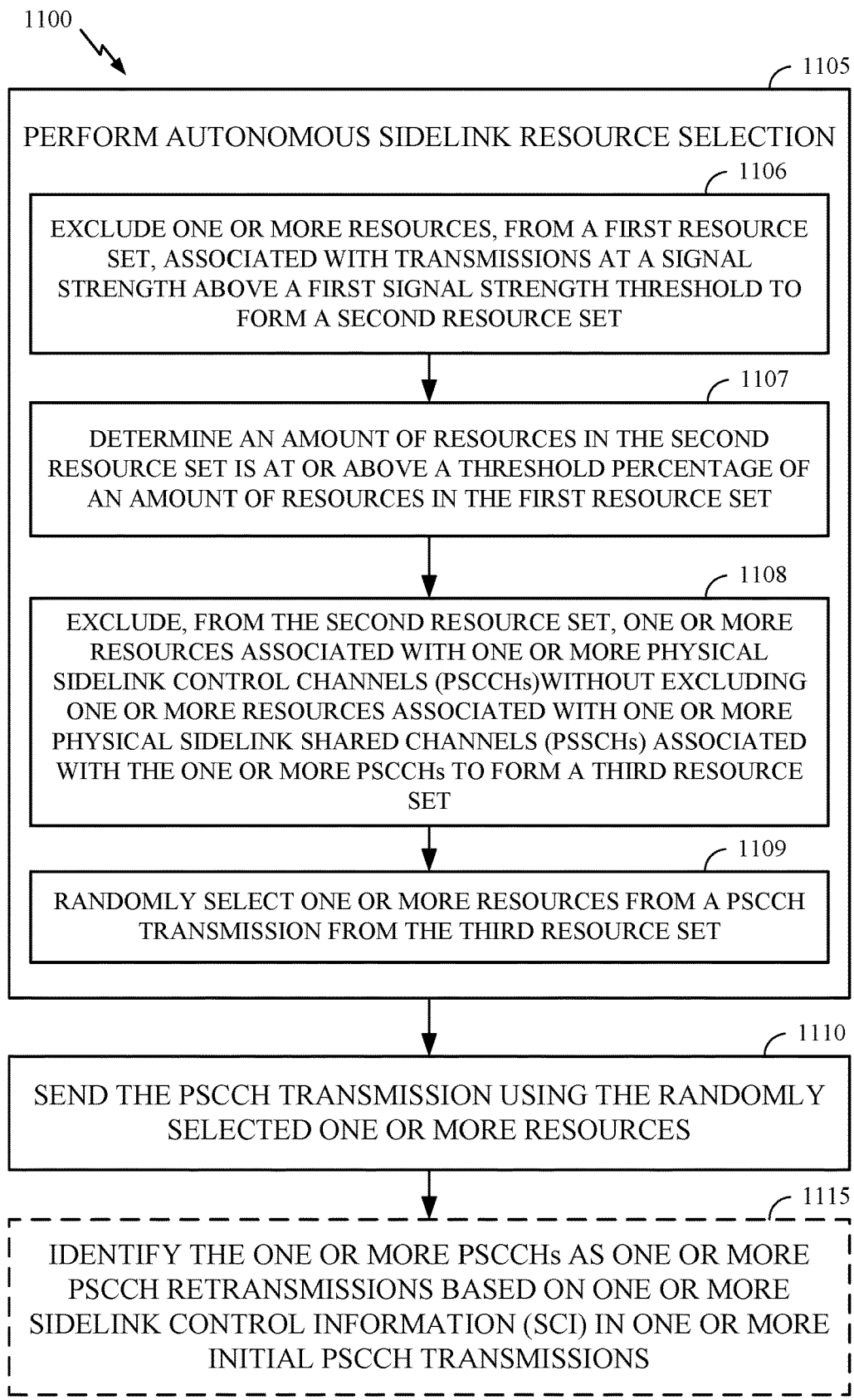
FIG. 11 is a flow diagram illustrating example operations for wireless communications by a UE, in accordance with aspects of the present disclosure.

FIG. 11 is a flow diagram illustrating example operations 1100 for wireless communication, in accordance with certain aspects of the present disclosure. The operations 1100 may be performed, for example, by a UE (e.g., such as the UE 120 $a$ in the wireless communication network 100). The operations 1100 may be implemented as software components that are executed and run on one or more processors (e.g., controller/processor 280 of FIG. 2). Further, the transmission and reception of signals by the UE in operations 1100 may be enabled, for example, by one or more antennas (e.g., antennas 252 of FIG. 2). In certain aspects, the transmission and/or reception of signals by the UE may be implemented via a bus interface of one or more processors (e.g., controller/processor 280) obtaining and/or outputting signals.

The operations 1100 may begin, at 1105, by performing autonomous sidelink resource selection. In the autonomous sidelink resource selection, at 1106, the UE excludes one or more resources, from a first resource set, associated with transmissions at a signal strength above a first signal strength threshold to form a second resource set. At 1107, the UE determines that an amount of resources in the second resource set are at or above a threshold percentage of an amount of resources in the first resource set. At 1108, the UE excludes, from the second resource set, one or more resources associated with one or more PSCCHs without excluding one or more resources associated with one or more PSSCHs associated with the one or more PSCCH to form a third resources set. At 1109, the UE randomly selects one or more resources for a PSCCH transmission from the third resource set.

In some aspects, excluding one or more resources associated with the one or more PSCCHs from the second resource set includes excluding one or more resources associated with one or more PSCCHs with the highest signal strength. In some aspects, excluding one or more resources associated with the one or more PSCCHs from the second resource set includes excluding, from the second resource set, one or more resources associated with one or more PSCCHs at a signal strength above a second signal strength threshold to form the third resource set, and determining whether an amount of resources in the third resource set are at or above the threshold percentage of the amount of resources in the first resource set. In further aspects, when the amount of resources in the third resource set is below the threshold percentage of the amount of resources in the first resource set, iteratively, performing until the resources in the third resource set are at or above the threshold percentage of the amount of resources in the first resource set, the UE may increase the second signal strength threshold to a third signal strength threshold. In such further aspects, the UE may further exclude, from the second resource set, one or more resources associated with one or more PSCCHs at a signal strength above the third signal strength threshold to form the third resource set; and re-determine whether the amount of resources in the third resource set are at or above the threshold percentage of the amount of resources in the first resource set.

In some aspects, randomly select the resources from the PSCCH transmission from the third resource set is based on the determining the amount of resources in the third resource set is at or above the threshold percentage of the amount of resources in the first resource set.

At 1110, the UE sends the PSCCH transmission using the randomly selected one or more resources.

In some aspects, at 1115, the UE may identify the one or more PSCCHs as one or more PSCCH retransmissions based on one or more sidelink control information (SCI) in one or more initial PSCCH transmissions. The UE may identify the one or more PSCCHs based on semi-persistent scheduling (SPS). The autonomous sidelink resource selection may comprise CV2X mode 4 autonomous resource selection. In some aspects, the first resource set may include resources within a selected transmission window. In some aspects, excluding resources from the first resource set, associated with transmissions at a signal strength above the first signal strength threshold to form the second resource set further includes excluding resources indicated in SCI within a previous number of subframes. In some aspects, the threshold percentage may be twenty percent.

In some aspects, the UE may adjust a default modulation and coding scheme (MCS) and a default number of resources for transmitting a message to avoid selecting a resource with a PSCCH transmission, and when the UE randomly selects resources for the PSCCH transmission from the third resource set, the UE randomly selects the adjust number of resources. In further aspects, When the UE adjusts the default MCS and the default number of resources for transmitting a message to avoid selecting a resource with a PSCCH transmission, the UE increases the default MCS and decreases a default number of subchannels to allow selection of subchannels from the second resource set that avoids a subchannel with a PSCCH transmission. In some aspects, when the UE adjusts the default MCS and the default number of resources for transmitting a message to avoid selecting resources with a PSCCH transmission, the UE decreases a default MCS and increases a default number of subchannels to allow selection of subchannels from the non-excluded resources from the second resource set that avoids a non-excluded subchannel with a PSCCH transmission.

Figure 12:
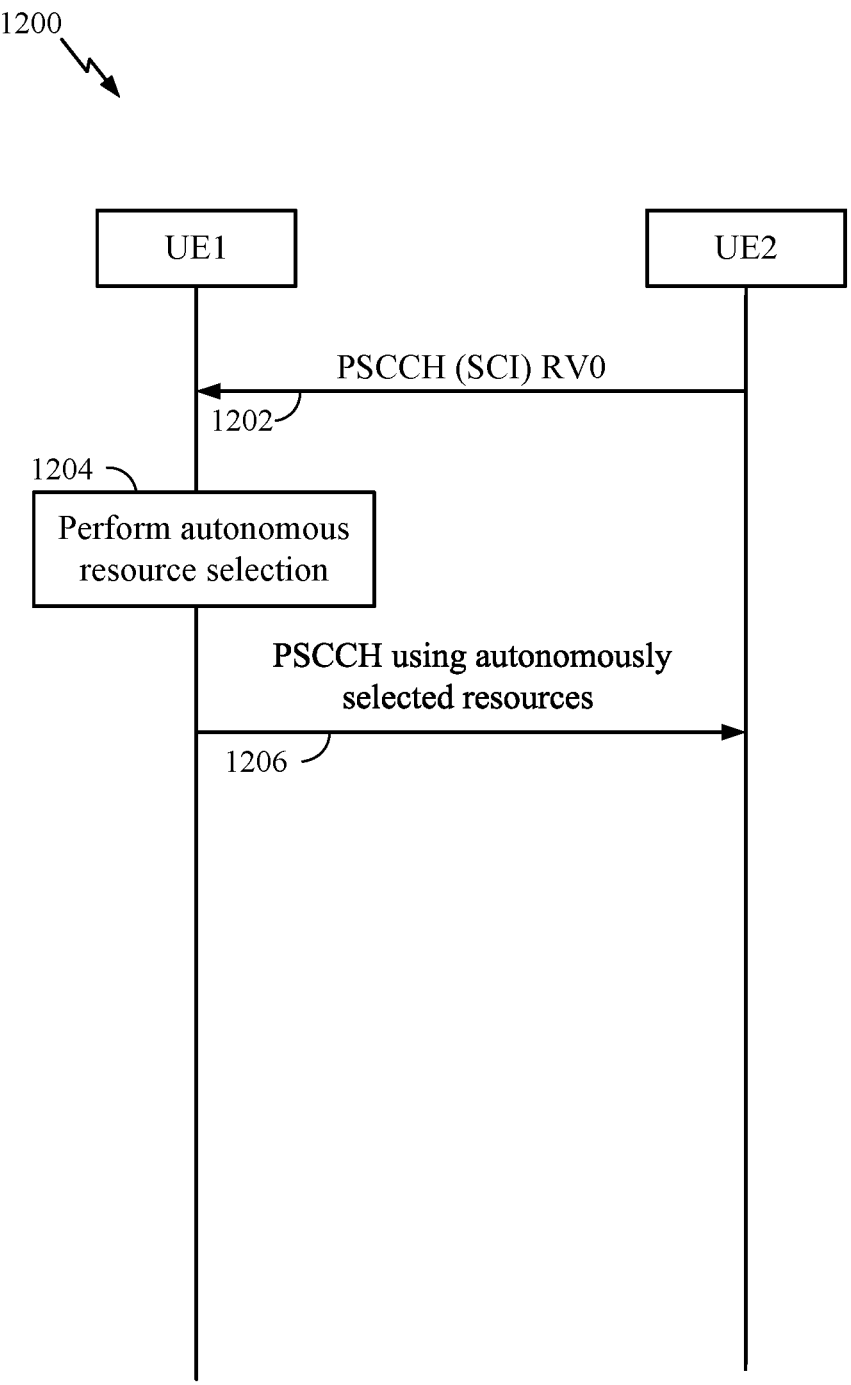
FIG. 12 is a call flow diagram illustrating example signaling for physical sidelink control channel (PSCCH) transmission using the UE autonomous sidelink resource selection, in accordance with aspects of the present disclosure.

FIG. 12 is a call flow diagram illustrating example signaling 1100 between a UE1 and a UE2, in accordance with certain aspects of the present disclosure. At 1202, the UE1 may receive from UE2 a $RV_0$ PSCCH transmission which may provide SCI and information about the corresponding PSSCH. At 1204, the UE may perform autonomous sidelink resource selection, in which the UE abstains from selecting PSCCH resources. Once the UE autonomously selects its resources, at 1206, the UE1 may send a PSCCH transmission using the autonomously selected resources.

In some aspects, when the UE excludes resources at 1204, the UE excludes resources associated with transmissions based on certain signal strength threshold (e.g., RSRP threshold). For example, the UE may excludes resources associated with transmissions at a signal strength above a first signal strength threshold from the total resources to form a first non-excluded resource set. The UE may then perform additional exclusions based on a threshold percentage of the total resources (e.g., 20% of the total resources). For example, the UE may exclude resources associated with one or more control channels and leave the corresponding shared channels included in the resource set. By excluding resources associated with control channels at 1204, the UE decreases the likelihood of collisions when randomly selecting resources for the UE's PSCCH transmission.

When excluding resources associated with control channels at 1204, the UE may exclude control channels with the highest signal strength or above a second signal strength threshold. After each exclusion, if the non-excluded resources are below the threshold percentage (e.g., 20% of the total resources), then the UE may increase the second signal threshold used for excluding control channels so that the non-excluded resources is at or above the threshold percentage. Accordingly, some resources that may have been excluded prior to increasing the second signal threshold would be re-included in the non-excluded resources from which the UE randomly selects.

Figure 13:
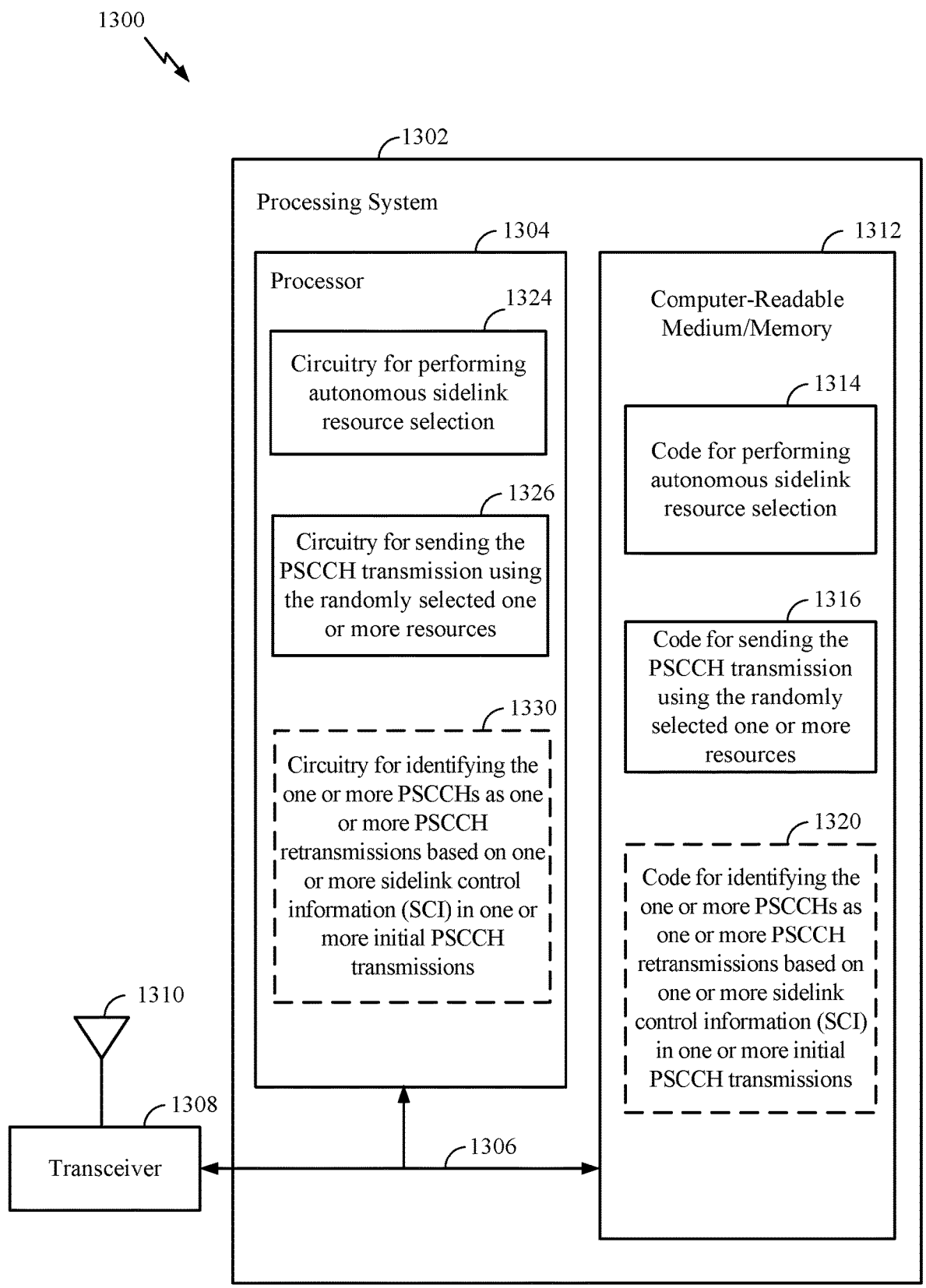
FIG. 13 illustrates a communications device that may include various components configured to perform operations for the techniques disclosed herein in accordance with aspects of the present disclosure.

FIG. 13 illustrates a communications device 1300 that may include various components (e.g., corresponding to means-plus-function components) configured to perform operations for the techniques disclosed herein, such as the operations illustrated in FIG. 11. The communications device 1300 includes a processing system 1302 coupled to a transceiver 1308 (e.g., a transmitter and/or a receiver). The transceiver 1308 is configured to transmit and receive signals for the communications device 1300 via an antenna 1310, such as the various signals as described herein. The processing system 1302 may be configured to perform processing functions for the communications device 1300, including processing signals received and/or to be transmitted by the communications device 1300.

The processing system 1302 includes a processor 1304 coupled to a computer-readable medium/memory 1312 via a bus 1306. In certain aspects, the computer-readable medium/memory 1312 is configured to store instructions (e.g., computer-executable code) that when executed by the processor 1304, cause the processor 1304 to perform the operations illustrated in FIG. 11, or other operations for performing the various techniques discussed herein for abstaining from selecting PSCCH resources during UE autonomous resource selection. In certain aspects, computer-readable medium/memory 1312 stores code 1314 for performing autonomous sidelink resource selection; and code 1316 for sending the PSCCH transmission using the randomly selected one or more resources. In certain aspects, computer-readable medium/memory 1312 stores code 1320 for identifying the one or more PSCCHs as one or more PSCCH retransmissions based on one or more SCI in the one or more initial PSCCH transmissions. In certain aspects, the processor 1304 has circuitry configured to implement the code stored in the computer-readable medium/memory 1312. The processor 1304 includes circuitry 1324 for performing autonomous sidelink resource selection; and circuitry 1326 for sending the PSCCH transmission using the randomly selected one or more resources. In certain aspects, the processor 1304 includes circuitry 1330 for identifying the one or more PSCCHs as one or more PSCCH retransmissions based on one or more SCI in the one or more initial PSCCH transmissions.

For example, means for transmitting (or means for outputting for transmission) may include a transmitter unit 254 and/or antenna(s) 252 of the UE 120 a illustrated in FIG. 2 and/or circuitry 1326 of the communication device 1300 in FIG. 13. Means for receiving (or means for obtaining) may include a receiver and/or antenna(s) 252 of the UE 120 a illustrated in FIG. 2. Means for communicating may include a transmitter, a receiver or both. Means for generating, means for performing, means for determining, means for taking action, means for determining, means for coordinating may include a processing system, which may include one or more processors, such as the receive processor 258, the transmit processor 264, the TX MIMO processor 266, and/or the controller/processor 280 of the UE 120 a illustrated in FIG. 2 and/or the processing system 1302 of the communication device 1300 in FIG. 13.

Example Aspects

Implementation examples are described in the following numbered clauses:

Aspect 1. A method for wireless communications, comprising: performing autonomous sidelink resource selection including: excluding one or more resources, from a first resource set, associated with transmissions at a signal strength above a first signal strength threshold to form a second resource set; determining an amount of resources in the second resource set is at or above a threshold percentage of an amount of resources in the first resource set; excluding, from the second resource set, one or more resources associated with one or more physical sidelink control channels (PSCCHs) without excluding one or more resources associated with one or more physical sidelink shared channels (PSSCHs) associated with the one or more PSCCHs to form a third resource set; and randomly selecting one or more resources for a PSCCH transmission from the third resource set; and sending the PSCCH transmission using the randomly selected one or more resources.

Aspect 2. The method of aspect 1, wherein the excluding, from the second resource set, the one or more resources associated with the one or more PSCCHs comprises: excluding one or more resources associated with one or more PSCCHs with a highest signal strength.

Aspect 3. The method of any of aspects 1 and 2, wherein the excluding, from the second resource set, the one or more resources associated with the one or more PSCCHs comprises: excluding, from the second resource set, one or more resources associated with one or more PSCCHs at a signal strength above a second signal strength threshold to form the third resource set; and determining whether an amount of resources in the third resource set is at or above the threshold percentage of the amount of resources in the first resource set.

Aspect 4. The method of aspect 3, further comprising: when the amount of resources in the third resource set is below the threshold percentage of the amount of resources in the first resource set, iteratively performing until the resources in the third resource set is at or above the threshold percentage of the amount of resources in the first resource set: increasing the second signal strength threshold to a third signal strength threshold; excluding, from the second resource set, one or more resources associated with one or more PSCCHs at a signal strength above the third signal strength threshold to form the third resource set; and re-determining whether the amount of resources in the third resource set is at or above the threshold percentage of the amount of resources in the first resource set.

Aspect 5. The method of any of aspects 3 and 4, wherein the randomly selecting the resources for the PSCCH transmission from the third resource set is based on the determining the amount of resources in the third resource set is at or above the threshold percentage of the amount of resources in the first resource set.

Aspect 6. The method of any of aspects 1-5, further comprising: identifying the one or more PSCCHs as one or more PSCCH retransmissions based on one or more sidelink control information (SCI) in one or more initial PSCCH transmissions.

Aspect 7. The method of any of aspects 1-6, further comprising: identifying the one or more PSCCHs based on semi-persistent scheduling (SPS).

Aspect 8. The method of any of aspects 1-7, wherein the autonomous sidelink resource selection comprises a cellular vehicle-to-everything (CV2x) mode 4 autonomous resource selection.

Aspect 9. The method of any of aspects 1-8, wherein the first resource set comprises resources within a selected transmission window.

Aspect 10. The method of any of aspects 1-9, wherein the excluding resources, from the first resource set, associated with transmissions at a signal strength above the first signal strength threshold to form the second resource set further comprises: excluding resources indicated in sidelink control information (SCI) within a previous number of subframes.

Aspect 11. The method of any of aspects 1-10, wherein the threshold percentage comprises twenty percent.

Aspect 12. The method of any of aspects 1-11, further comprising: adjusting a default modulation and coding scheme (MCS) and a default number of resources for transmitting a message to avoid selecting a resource with a physical sidelink control channel (PSCCH) transmission, wherein randomly selecting the resources for the PSCCH transmission from the third resource set comprises randomly selecting the adjusted number of resources.

Aspect 13. The method of aspect 12, wherein adjusting the default MCS and the default number of resources for transmitting a message to avoid selecting a resource with a PSCCH transmission comprises: increasing the default MCS and decreasing a default number of subchannels to allow selection of subchannels from the second resource set that avoids a subchannel with a PSCCH transmission.

Aspect 14. The method of any of aspects 12 and 13, wherein adjusting the default MCS and the default number of resources for transmitting a message to avoid selecting a resource with a PSCCH transmission comprises: decreasing a default MCS and increasing a default number of subchannels to allow selection of subchannels from the second resource set that avoids a non-excluded subchannel with a PSCCH transmission.

Aspect 15. An apparatus comprising means for performing the method of any of aspects 1 through 14.

Aspect 16. An apparatus comprising at least one processor and a memory coupled to the at least one processor, the memory comprising code executable by the at least one processor to cause the apparatus to perform the method of any of aspects 1 through 14.

Aspect 17. A computer readable medium storing computer executable code thereon for wireless communications that, when executed by at least one processor, cause an apparatus to perform the method of any of aspects 1 through 14.

The techniques described herein may be used for various wireless communication technologies, such as NR (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS.

A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, a digital signal processor (DSP), an application specific integrated circuit (ASIC), or a processor (e.g., a general purpose or specifically programmed processor). Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a DSP, an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein, for example, instructions for performing the operations described herein and illustrated in FIG. 11.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The invention claimed is:
1. An apparatus for wireless communication, comprising:
at least one processor; and
a memory coupled to the at least one processor, the memory comprising code executable by the at least one processor to cause the apparatus to:
perform autonomous sidelink resource selection, including:
excluding one or more resources, from a first resource set, associated with transmissions at a signal strength above a first signal strength threshold to form a second resource set;

determining an amount of resources in the second resource set is at or above a threshold percentage of an amount of resources in the first resource set;

excluding, from the second resource set, one or more resources associated with one or more physical sidelink control channels (PSCCHs) without excluding one or more resources associated with one or more physical sidelink shared channels (PSSCHs) associated with the one or more PSCCHs to form a third resource set; and randomly selecting one or more resources for a PSCCH transmission from the third resource set; and send the PSCCH transmission using the randomly selected one or more resources.

2. The apparatus of claim 1, wherein the code executable by the at least one processor to cause the apparatus to exclude, from the second resource set, the one or more resources associated with the one or more PSCCHs comprises:

code executable by the at least one processor to cause the apparatus to exclude one or more resources associated with one or more PSCCHs with a highest signal strength.

3. The apparatus of claim 1, wherein the code executable by the at least one processor to cause the apparatus to exclude, from the second resource set, the one or more resources associated with the one or more PSCCHs comprises code executable by the at least one processor to cause the apparatus to:

exclude, from the second resource set, one or more resources associated with one or more PSCCHs at a signal strength above a second signal strength threshold to form the third resource set; and determine whether an amount of resources in the third resource set is at or above the threshold percentage of the amount of resources in the first resource set.

4. The apparatus of claim 3, the memory further comprises code executable by the at least one processor to cause the apparatus to:

when the amount of resources in the third resource set is below the threshold percentage of the amount of resources in the first resource set, iteratively perform until the resources in the third resource set is at or above the threshold percentage of the amount of resources in the first resource set:
increasing the second signal strength threshold to a third signal strength threshold;
excluding, from the second resource set, one or more resources associated with one or more PSCCHs at a signal strength above the third signal strength threshold to form the third resource set; and
re-determining whether the amount of resources in the third resource set is at or above the threshold percentage of the amount of resources in the first resource set.

5. The apparatus of claim 3, wherein the code executable by the at least one processor to cause the apparatus to randomly select the resources for the PSCCH transmission from the third resource set is based on comprises code executable by the at least one processor to cause the apparatus to re-determine the amount of resources in the third resource set is at or above the threshold percentage of the amount of resources in the first resource set.

6. The apparatus of claim 1, wherein the memory further comprises code executable by the at least one processor to cause the apparatus to:

identify the one or more PSCCHs as one or more PSCCH retransmissions based on one or more sidelink control information (SCI) in one or more initial PSCCH transmissions.

7. The apparatus of claim 1, wherein the memory further comprises code executable by the at least one processor to cause the apparatus to:
identify the one or more PSCCHs based on semi-persistent scheduling (SPS).

8. The apparatus of claim 1, wherein the autonomous sidelink resource selection comprises a cellular vehicle-to-everything (CV2x) mode 4 autonomous resource selection.

9. The apparatus of claim 1, wherein the first resource set comprises resources within a selected transmission window.

10. The apparatus of claim 1, wherein the code executable by the at least one processor to cause the apparatus to excluding resources, from the first resource set, associated with transmissions at a signal strength above the first signal strength threshold to form the second resource set further comprises code executable by the at least one processor to cause the apparatus to:
exclude resources indicated in sidelink control information (SCI) within a previous number of subframes.

11. The apparatus of claim 1, wherein the threshold percentage comprises twenty percent.

12. The apparatus of claim 1, wherein the memory further comprises code executable by the at least one processor to cause the apparatus to:
adjust a default modulation and coding scheme (MCS) and a default number of resources for transmitting a message to avoid selecting a resource with a physical sidelink control channel (PSCCH) transmission, wherein
the code executable by the at least one processor to cause the apparatus to randomly select the resources for the PSCCH transmission from the third resource set comprises code executable by the at least one processor to cause the apparatus to randomly select the adjusted number of resources.

13. The apparatus of claim 12, wherein the code executable by the at least one processor to cause the apparatus to adjust the default MCS and the default number of resources for transmitting a message to avoid selecting a resource with a PSCCH transmission comprises code executable by the at least one processor to cause the apparatus to:
increase the default MCS and decrease a default number of subchannels to allow selection of subchannels from the second resource set that avoids a subchannel with a PSCCH transmission.

14. The apparatus of claim 12, wherein the code executable by the at least one processor to cause the apparatus to adjust the default MCS and the default number of resources for transmitting a message to avoid selecting a resource with a PSCCH transmission comprises code executable by the at least one processor to cause the apparatus to:
decrease a default MCS and increase a default number of subchannels to allow selection of subchannels from the second resource set that avoids a non-excluded subchannel with a PSCCH transmission.

15. A method for wireless communications, comprising:
performing autonomous sidelink resource selection including:
excluding one or more resources, from a first resource set, associated with transmissions at a signal strength above a first signal strength threshold to form a second resource set;

determining an amount of resources in the second resource set is at or above a threshold percentage of an amount of resources in the first resource set;

excluding, from the second resource set, one or more resources associated with one or more physical sidelink control channels (PSCCHs) without excluding one or more resources associated with one or more physical sidelink shared channels (PSSCHs) associated with the one or more PSCCHs to form a third resource set; and randomly selecting one or more resources for a PSCCH transmission from the third resource set; and sending the PSCCH transmission using the randomly selected one or more resources.

16. The method of claim 15, wherein the excluding, from the second resource set, the one or more resources associated with the one or more PSCCHs comprises:

excluding one or more resources associated with one or more PSCCHs with a highest signal strength.

17. The method of claim 15, wherein the excluding, from the second resource set, the one or more resources associated with the one or more PSCCHs comprises:

excluding, from the second resource set, one or more resources associated with one or more PSCCHs at a signal strength above a second signal strength threshold to form the third resource set; and determining whether an amount of resources in the third resource set is at or above the threshold percentage of the amount of resources in the first resource set.

18. The method of claim 17, further comprising:

when the amount of resources in the third resource set is below the threshold percentage of the amount of resources in the first resource set, iteratively performing until the resources in the third resource set is at or above the threshold percentage of the amount of resources in the first resource set:

increasing the second signal strength threshold to a third signal strength threshold;

excluding, from the second resource set, one or more resources associated with one or more PSCCHs at a signal strength above the third signal strength threshold to form the third resource set; and re-determining whether the amount of resources in the third resource set is at or above the threshold percentage of the amount of resources in the first resource set.

19. The method of claim 17, wherein the randomly selecting the resources for the PSCCH transmission from the third resource set is based on the determining the amount of resources in the third resource set is at or above the threshold percentage of the amount of resources in the first resource set.

20. The method of claim 15, further comprising:

identifying the one or more PSCCHs as one or more PSCCH retransmissions based on one or more sidelink control information (SCI) in one or more initial PSCCH transmissions.

21. The method of claim 15, further comprising:

identifying the one or more PSCCHs based on semi-persistent scheduling (SPS).

22. The method of claim 15, wherein the autonomous sidelink resource selection comprises a cellular vehicle-to-everything (CV2x) mode 4 autonomous resource selection.

23. The method of claim 15, wherein the first resource set comprises resources within a selected transmission window.

24. The method of claim 15, wherein the excluding resources, from the first resource set, associated with transmissions at a signal strength above the first signal strength threshold to form the second resource set further comprises:

excluding resources indicated in sidelink control information (SCI) within a previous number of subframes.

25. The method of claim 15, wherein the threshold percentage comprises twenty percent.

26. The method of claim 15, further comprising:

adjusting a default modulation and coding scheme (MCS) and a default number of resources for transmitting a message to avoid selecting a resource with a physical sidelink control channel (PSCCH) transmission, wherein randomly selecting the resources for the PSCCH transmission from the third resource set comprises randomly selecting the adjusted number of resources.

27. The method of claim 26, wherein adjusting the default MCS and the default number of resources for transmitting a message to avoid selecting a resource with a PSCCH transmission comprises:

increasing the default MCS and decreasing a default number of subchannels to allow selection of subchannels from the second resource set that avoids a subchannel with a PSCCH transmission.

28. The method of claim 26, wherein adjusting the default MCS and the default number of resources for transmitting a message to avoid selecting a resource with a PSCCH transmission comprises:

decreasing a default MCS and increasing a default number of subchannels to allow selection of subchannels from the second resource set that avoids a non-excluded subchannel with a PSCCH transmission.

29. An apparatus for wireless communication, comprising:

means for performing autonomous sidelink resource selection, including:

means for excluding one or more resources, from a first resource set, associated with transmissions at a signal strength above a first signal strength threshold to form a second resource set;

means for determining an amount of resources in the second resource set is at or above a threshold percentage of an amount of resources in the first resource set;

means for excluding, from the second resource set, one or more resources associated with one or more physical sidelink control channels (PSCCHs) without excluding one or more resources associated with one or more physical sidelink shared channels (PSSCHs) associated with the one or more PSCCHs to form a third resource set; and means for randomly selecting one or more resources for a PSCCH transmission from the third resource set; and means for sending the PSCCH transmission using the randomly selected one or more resources.

30. A non-transitory computer readable medium storing computer executable code thereon for wireless communications, comprising:

code for performing autonomous sidelink resource selection, including:

code for excluding one or more resources, from a first resource set, associated with transmissions at a signal strength above a first signal strength threshold to form a second resource set;

code for determining an amount of resources in the second resource set is at or above a threshold percentage of an amount of resources in the first resource set;

code for excluding, from the second resource set, one or more resources associated with one or more physical sidelink control channels (PSCCHs) without excluding one or more resources associated with one or more physical sidelink shared channels (PSSCHs) associated with the one or more PSCCHs to form a third resource set; and code for randomly selecting one or more resources for a PSCCH transmission from the third resource set; and code for sending the PSCCH transmission using the randomly selected one or more resources.

* * * * *